United States Patent
Nee

(10) Patent No.: US 7,045,187 B2
(45) Date of Patent: *May 16, 2006

(54) METAL ALLOYS FOR THE REFLECTIVE OR THE SEMI-REFLECTIVE LAYER OF AN OPTICAL STORAGE MEDIUM

(76) Inventor: Han H. Nee, 7 Sommet, Newport Coast, CA (US) 92614

( * ) Notice: Subject to any disclaimer, the term of this patent is extended or adjusted under 35 U.S.C. 154(b) by 53 days.

This patent is subject to a terminal disclaimer.

(21) Appl. No.: 10/939,074

(22) Filed: Sep. 10, 2004

(65) Prior Publication Data

US 2005/0042406 A1 Feb. 24, 2005

Related U.S. Application Data

(63) Continuation-in-part of application No. 10/342,649, filed on Jan. 15, 2003, now Pat. No. 6,790,503, which is a continuation-in-part of application No. 10/090,855, filed on Mar. 4, 2002, now Pat. No. 6,764,735, which is a continuation-in-part of application No. 09/661,062, filed on Sep. 13, 2000, now Pat. No. 6,451,402, which is a continuation-in-part of application No. 09/557,135, filed on Apr. 25, 2000, now abandoned, which is a continuation-in-part of application No. 09/438,864, filed on Nov. 12, 1999, now Pat. No. 6,280,811, which is a continuation-in-part of application No. 09/102,163, filed on Jun. 22, 1998, now Pat. No. 6,007,889.

(51) Int. Cl.
B32B 3/02 (2006.01)

(52) U.S. Cl. ............... 428/64.1; 428/64.4; 430/270.12

(58) Field of Classification Search ............... 428/64.1, 428/64.4, 913; 430/270.12, 495.1, 945
See application file for complete search history.

(56) References Cited

U.S. PATENT DOCUMENTS

| | | | |
|---|---|---|---|
| 4,404,656 A | 9/1983 | Cornet et al. |
| 4,405,994 A | 9/1983 | Cornet et al. |
| 4,450,553 A | 5/1984 | Holster et al. |
| 4,709,363 A | 11/1987 | Dirks et al. |
| 4,998,239 A | 3/1991 | Strandjord et al. |
| 5,090,009 A | 2/1992 | Hamada et al. |
| 5,093,174 A | 3/1992 | Suzuki et al. |
| 5,171,392 A | 12/1992 | Iida et al. |
| 5,325,351 A | 6/1994 | Uchiyama et al. |
| 5,391,462 A | 2/1995 | Arioka et al. |
| 5,415,914 A | 5/1995 | Arioka et al. |
| 5,419,939 A | 5/1995 | Arioka et al. |
| 5,498,507 A | 3/1996 | Handa et al. |

(Continued)

FOREIGN PATENT DOCUMENTS

CA 2401389 7/2002

(Continued)

OTHER PUBLICATIONS

English Translation of PCT Publication No. WO 00/21079.

(Continued)

*Primary Examiner*—Elizabeth Mulvaney
(74) *Attorney, Agent, or Firm*—Woodard, Emhardt, Moriarty, McNett & Henry LLP

(57) ABSTRACT

Metal alloy thin films are provided for use in the highly reflective and semi-reflective layers of optical discs. Alloys include silver alloyed with gold, palladium, copper, rhodium, ruthenium, osmium, iridium, and platinum. Other alloys include copper alloys with silver, magnesium, cadmium, aluminum, nickel, beryllium, zirconium and zinc. These alloys have moderate to high reflectivity and reasonable corrosion resistance in the ambient environment.

100 Claims, 12 Drawing Sheets

U.S. PATENT DOCUMENTS

| | | |
|---|---|---|
| 5,620,767 A | 4/1997 | Harigaya et al. |
| 5,640,382 A | 6/1997 | Florczak et al. |
| 5,673,251 A | 9/1997 | Suzuki et al. |
| 5,719,006 A | 2/1998 | Ohkubo |
| 5,741,603 A | 4/1998 | Yasuda |
| 5,753,413 A | 5/1998 | Nishida et al. |
| 5,820,994 A | 10/1998 | Gotoh et al. |
| 5,853,872 A | 12/1998 | Shimamori et al. |
| 5,948,497 A | 9/1999 | Hatwar et al. |
| 6,007,887 A | 12/1999 | Hatwar et al. |
| 6,007,889 A * | 12/1999 | Nee ............ 428/64.1 |
| 6,228,457 B1 | 5/2001 | Ueno et al. |
| 6,232,036 B1 | 5/2001 | Suzuki et al. |
| 6,242,068 B1 | 6/2001 | Preuss |
| 6,280,811 B1 * | 8/2001 | Nee ............ 428/64.1 |
| 6,292,457 B1 | 9/2001 | Preuss et al. |
| 6,351,446 B1 | 2/2002 | Weinzerl et al. |
| 6,451,402 B1 * | 9/2002 | Nee ............ 428/64.1 |
| 6,544,616 B1 | 4/2003 | Nee |
| 6,764,735 B1 | 7/2004 | Nee |
| 6,790,503 B1 * | 9/2004 | Nee ............ 428/64.1 |
| 6,852,384 B1 * | 2/2005 | Nee ............ 428/64.1 |
| 2002/0034603 A1 | 3/2002 | Nee |
| 2002/0122913 A1 | 9/2002 | Nee |
| 2002/0150772 A1 | 10/2002 | Nakai et al. |
| 2003/0003395 A1 | 1/2003 | Yuzurihara et al. |
| 2003/0008236 A1 | 1/2003 | Yamada et al. |
| 2003/0081537 A1 | 5/2003 | Shinotsuka |
| 2003/0180495 A1 | 9/2003 | Ito et al. |
| 2003/0215598 A1 | 11/2003 | Nee |
| 2004/0005432 A1 * | 1/2004 | Ridout et al. ........... 428/64.4 |
| 2004/0048193 A1 * | 3/2004 | Lichtenberger et al. 430/270.11 |
| 2004/0161630 A1 * | 8/2004 | Specht et al. ........... 428/673 |
| 2004/0191463 A1 * | 9/2004 | Nee ............ 428/64.4 |
| 2004/0253137 A1 * | 12/2004 | Gehlert et al. ........... 420/501 |
| 2005/0048251 A1 * | 3/2005 | Lichtenberger ............ 428/64.4 |

FOREIGN PATENT DOCUMENTS

| | | |
|---|---|---|
| DE | 3728106 | 3/1989 |
| EP | 0 720 159 A2 | 7/1996 |
| EP | 0 737 966 A1 | 10/1996 |
| EP | 0 745 985 A2 | 12/1996 |
| EP | 0 798 401 A2 | 10/1997 |
| EP | 0 594 516 B1 | 5/1998 |
| EP | 0 867 868 A | 9/1998 |
| EP | 0 917 137 A | 5/1999 |
| JP | 61-019747 | 1/1986 |
| JP | 61-069935 | 4/1986 |
| JP | 02-192046 | 7/1990 |
| JP | 403025737 | 2/1991 |
| JP | 03286432 A | 12/1991 |
| JP | 04-176039 | 6/1992 |
| JP | XP002260270 | 6/1992 |
| JP | 324133/92 | 11/1992 |
| JP | 05012710 | 1/1993 |
| JP | 0 507 3975 A | 3/1993 |
| JP | 325406/94 | 5/1993 |
| JP | 05215634 | 9/1994 |
| JP | 05115763 | 11/1994 |
| JP | 07-006427 | 1/1995 |
| JP | 06107566 | 1/1995 |
| JP | 07014221 A | 1/1995 |
| JP | 05195011 | 2/1995 |
| JP | 05179739 | 3/1995 |
| JP | 05215547 | 3/1995 |
| JP | 05233110 | 3/1995 |
| JP | 07-105575 | 4/1995 |
| JP | 05249821 | 4/1995 |
| JP | 05251824 | 4/1995 |
| JP | 05277809 | 4/1995 |
| JP | 07105575 A | 4/1995 |
| JP | 05312129 | 6/1995 |
| JP | 06065594 | 10/1995 |
| JP | 07036958 | 10/1995 |
| JP | 06111259 | 12/1995 |
| JP | 06123718 | 12/1995 |
| JP | 07116045 | 12/1995 |
| JP | 06141602 | 1/1996 |
| JP | 06143042 | 1/1996 |
| JP | 06206963 | 3/1996 |
| JP | 06225691 | 3/1996 |
| JP | 06253971 | 5/1996 |
| JP | 07223758 | 5/1996 |
| JP | 07038628 | 9/1996 |
| JP | 273193/96 | 10/1996 |
| JP | 07076177 | 10/1996 |
| JP | 08297858 | 11/1996 |
| JP | 07139459 | 12/1996 |
| JP | 09007226 | 1/1997 |
| JP | 25515/99 | 7/1997 |
| JP | 09-212915 | 8/1997 |
| JP | 08014667 | 8/1997 |
| JP | 08019648 | 8/1997 |
| JP | 08035523 | 8/1997 |
| JP | 08050199 | 9/1997 |
| JP | 08115029 | 11/1997 |
| JP | 08149725 | 12/1997 |
| JP | 10-011799 | 1/1998 |
| JP | 08158147 | 1/1998 |
| JP | 10-177742 | 6/1998 |
| JP | 411012734 | 1/1999 |
| JP | 2000-228032 | 8/2000 |
| JP | 2000-402146 | 7/2002 |
| WO | WO 97/22968 | 6/1997 |
| WO | WO 00/21079 | 4/2000 |
| WO | WO 02/2054396 | 7/2002 |

OTHER PUBLICATIONS

English Translation of EP Publication No. 0 594 516 B1.
English Translation of JP Publication No. 02-192046.
English Translation of JP Publication No. 10-011799.
English Translation of JP Publication No. 09-212915.
English Translation of JP Publication No. 07-105575.
Kirk-Othmer, *Encyclopedia of Chemical Technology*, 3rd Ed., vol. 10, pp. 247-283.
*SPIE Conference Proceeding*, vol. 2890, pp. 2-9, Nov. 1996.
Bond, W.L. Notes on Solution of Problems in Odd Job Vapor Coating, *J. Optical Society of America*, Jun. 1954, pp. 429-438, vol. 44, No. 6.

* cited by examiner

METAL ALLOYS FOR THE REFLECTIVE OR THE SEMI-REFLECTIVE LAYER OF AN OPTICAL STORAGE MEDIUM

PRIORITY CLAIM

This is a continuation-in-part of my prior application Ser. No. 10/342,649 filed Jan. 15, 2003, which is expected to issue as U.S. Pat. No. 6,790,503 on Sep. 14, 2004, which is a continuation-in-part of my prior application Ser. No. 10/090,855 filed Mar. 4, 2002, which is now U.S. Pat. No. 6,764,735, which is a continuation-in-part of my prior application Ser. No. 09/661,062 filed Sep. 13, 2000, which is now U.S. Pat. No. 6,451,402 which is a continuation-in-part of my prior application Ser. No. 09/557,135, filed Apr. 25, 2000 now abandoned, which is a continuation-in-part of my prior application Ser. No. 09/438,864, filed Nov. 12, 1999, which is now U.S. Pat. No. 6,280,311, which is a continuation-in-part of my prior application Ser. No. 09/102,163, filed Jun. 22, 1998, which is now U.S. Pat. No. 6,007,889.

FIELD OF THE INVENTION

This invention relates to reflective layers or semi-reflective layers used in optical storage media that are made of silver-based alloys or copper-based alloys.

BACKGROUND OF THE INVENTION

Four layers are generally present in the construction of a conventional, prerecorded, optical disc. A first layer is usually made from optical grade, polycarbonate resin. This layer is manufactured by well-known techniques that usually begin by injection or compression molding the resin into a disc. The surface of the disc is molded or stamped with extremely small and precisely located pits and lands. These pits and lands have a predetermined size and, as explained below, are ultimately the vehicles for storing information on the disc.

After stamping, an optically reflective layer is placed over the information pits and lands. The reflective layer is usually made of aluminum or an aluminum alloy and is typically between about 40 to about 100 nanometers (nm) thick. The reflective layer is usually deposited by one of many well-known vapor deposition techniques such as sputtering or thermal evaporation. *Kirk-Othmer, Encyclopedia of Chemical Technology*, $3^{rd}$ ed. Vol. 10, pp. 247 to 283, offers a detailed explanation of these and other deposition techniques such as glow discharge, ion plating, and chemical vapor deposition, and this specification hereby incorporates that disclosure by reference.

Next, a solvent-based or a UV (ultraviolet) curing-type resin is applied over the reflective layer, which is usually followed by a label. The third layer protects the reflective layer from handling and the ambient environment. And the label identifies the particular information that is stored on the disc, and sometimes, may include artwork.

The information pits residing between the polycarbonate resin and the reflective layer usually take the form of a continuous spiral. The spiral typically begins at an inside radius and ends at an outside radius. The distance between any 2 spirals is called the "track pitch" and is usually about 1.6 microns. The length of one pit or land in the direction of the track is from about 0.9 to about 3.3 microns. All of these details are commonly known for compact audio discs and reside in a series of specifications that were first proposed by Philips N V of Holland and Sony of Japan as standards for the industry.

The disc is read by pointing a laser beam through the optical grade polycarbonate and onto the reflective layer with sufficiently small resolution to focus on the information pits. The pits have a depth of about ¼ of the wavelength of the laser light, and the light generally has a wavelength in the range of about 780 to 820 nanometers, although wavelengths as short as 400 nanometers are also used. Destructive (dark) or constructive (bright) interference of the laser light is then produced as the laser travels along the spiral track, focusing on an alternating stream of pits and lands in its path.

This on and off change of light intensity from dark to bright or from bright to dark forms the basis of a digital data stream of 1 and 0's. When there is no light intensity change in a fixed time interval, the digital signal is "0," and when there is light intensity change from either dark to bright or bright to dark, the digital signal is "1." The continuous stream of ones and zeros that results is then electronically decoded and presented in a format that is meaningful to the user such as music or computer programming data.

As a result, it is important to have a highly reflective coating on the disc to reflect the laser light from the disc and onto a detector in order to read the presence of an intensity change. In general, the reflective layer is usually aluminum, copper, silver, or gold, all of which have a high optical reflectivity of more than 80 percent. Aluminum and aluminum alloys are commonly used because they have a comparatively lower cost, adequate corrosion resistance, and are easily placed onto the polycarbonate disc.

Occasionally and usually for cosmetic reasons, a gold or copper based alloy is used to offer the consumer a "gold" colored disc. Although gold naturally offers a rich color and satisfies all the functional requirements of a highly reflective layer, it is comparatively much more expensive than aluminum. Therefore, frequently a copper-based alloy that contains zinc or tin is sometimes used to produce the gold colored layer. But unfortunately, the exchange is not truly satisfactory because the copper alloy's corrosion resistance, in general, is considered worse than aluminum, which results in a disc that has a shorter life span than one with an aluminum reflective layer.

For the convenience of the reader, additional details in the manufacture and operation of an optically readable storage system can be found in U.S. Pat. No. 4,998,239 to Strandjord et al. and U.S. Pat. No. 4,709,363 to Dirks et al., the disclosures of which are hereby incorporated by reference.

Another type of disc in the compact disc family that has become popular is the recordable compact disc or "CD-R." This disc is similar to the CD described earlier, but it has a few changes. The recordable compact disc begins with a continuous spiral groove instead of a continuous spiral of pits and has a layer of organic dye between the polycarbonate substrate and the reflective layer. The disc is recorded by periodically focusing a laser beam into the grooves as the laser travels along the spiral track. The laser heats the dye to a high temperature, which in turn places pits in the groove that coincide with an input data stream of ones and zeros by periodically deforming and decomposing the dye.

For the convenience of the reader, additional details regarding the operation and construction of these recordable discs can be found in U.S. Pat. No. 5,325,351 to Uchiyama et al., and U.S. Pat. Nos. 5,391,462; 5,415,914; and 5,419,939 to Arioka et al., and U.S. Pat. No. 5,620,767 to Harigaya et al., the disclosures of which are hereby incorporated into this specification by reference.

The key component of a CD-R disc is the organic dye, which is made from solvent and one or more organic compounds from the cyanine, phthalocyanine or azo family. The disc is normally produced by spin coating the dye onto the disc and sputtering the reflective layer over the dye after the dye is sufficiently dry. But because the dye may contain halogen ions or other chemicals that can corrode the reflective layer, many commonly used reflective layer materials such as aluminum may not be suitable to give the CD-R disc a reasonable life span. So being, frequently gold must be used to manufacture a recordable CD. But while gold satisfies all the functional requirements of CD-R discs, it is a very expensive solution.

Recently, other types of recordable optical disks have been developed. These optical disks use a phase-change or magneto-optic material as the recording medium. An optical laser is used to change the phase or magnetic state (microstructural change) of the recording layer by modulating a beam focused on the recording medium while the medium is rotated to produce microstructural changes in the recording layer. During playback, changes in the intensity of light from the optical beam reflected through the recording medium are sensed by a detector. These modulations in light intensity are due to variations in the microstructure of the recording medium produced during the recording process. Some phase-change and/or magneto-optic materials may be readily and repeatedly transformed from a first state to a second state and back again with substantially no degradation. These materials may be used as the recording media for a compact disc-rewritable disc, commonly known as CD-RW.

To record and read information, phase change discs utilize the recording layer's ability to change from a first dark to a second light phase and back again. Recording on these materials produces a series of alternating dark and light spots according to digital input data introduced as modulations in the recording laser beam. These light and dark spots on the recording medium correspond to 0's and 1's in terms of digital data. The digitized data is read using a low-power laser focused along the track of the disc to play back the recorded information. The laser's power is low enough so that it does not further change the state of the recording media but is powerful enough so that the variations in reflectivity of the recording medium may be easily distinguished by a detector. The recording medium may be erased for re-recording by focussing a laser of intermediate power on the recording medium. This returns the recording medium layer to its original or erased state. A more detailed discussion of the recording mechanism of optically recordable media can be found in U.S. Pat. Nos. 5,741,603; 5,498,507; and 5,719,006 assigned to the Sony Corporation, the TDK Corporation, and the NEC Corporation, all of Tokyo, Japan, respectively, the disclosures of which are incorporated herein by reference in their entirety.

Still another type of disc in the optimal disc family that has become popular is a prerecorded optical disc called the digital video disc or "DVD." This disc has two halves. Each half is made of polycarbonate resin that has been injection or compression molded with pit information and then sputter coated with a reflective layer, as described earlier. These two halves are then bonded or glued together with a UV curing resin or a hot melt adhesive to form the whole disc. The disc can then be played from both sides as contrasted from the compact disc or CD where information is usually obtained only from one side. The size of a DVD is about the same as a CD, but the information density is considerably higher. The track pitch is about 0.7 micron and the length of the pits and lands is from approximately 0.3 to 1.4 microns.

One variation of the DVD family of discs is the DVD-dual layer disc. This disc also has two information layers; however, both are played back from one side. In this arrangement, the high reflectivity layer is usually the same as that previously described. But the second layer is only semi-reflective with a reflectivity in the range of approximately 18 to 30 percent. In addition to reflecting light, this second layer must also pass a substantial amount of light so that the laser beam can reach the highly reflective layer underneath and then reflect back through the semi-reflective layer to the signal detector.

In a continued attempt to increase the storage capacity of optical discs, a multi-layer disc can be constructed as indicated in the publication "SPIE Conference Proceeding Vol. 2890, page 2–9, November, 1996" where a tri-layer or a quadri-layer optical disc was revealed, the disclosure of which is specifically incorporated into this specification by reference.

All the data layers were played back from one side of the disc using laser light at 650 nm wavelength. A double-sided tri-layered read-only-disc that includes a total of six layers can have a storage capacity of about 26 Giga bytes of information.

Currently, the potential choice of the semi-reflective layer is either gold or silicon with a thickness in the range of 5 to 70 nanometers, as discussed in U.S. Pat. No. 5,171,392 to Iida et al., the disclosure of which is hereby incorporated by reference. Gold, when sufficiently thin, will both reflect and transmit light, has outstanding corrosion resistance, and is relatively easy to sputter into a coating of uniform thickness. But once again, it is also comparatively more expensive than other metals. Silicon is a reasonable alternative to gold, but because it is a semiconductor, its sputtering yield and sputtering rate are significantly lower than gold when applied with the same power. Moreover, silicon also has a tendency to react with oxygen and nitrogen during sputtering, which introduces a whole additional set of problems. For example, usually the application of silicon requires a more complicated sputtering apparatus than one that is normally required to apply other reflective metals. And as a result, neither gold nor silicon offers an ideal semi-reflective layer for use in this type of disc.

Recent advances in the development of particular silver alloy thin films for use as both semi-reflective and highly reflective layers in DVD-9s has made it feasible to create tri-layer and even quadruple-layer optical discs with all playback information layers on the same side of the disc. See for example, U.S. Pat. Nos. 6,007,889, and 6,280,811 to Nee incorporated herein in their entirety. Thus multiple-layer disc can be constructed and manufactured at low cost. Combined with objective lens having a numerical aperture (NA) of 0.60, and playback lasers having a wavelength of about 650 nm, multiple-layer optical storage devices with the capacity to store 14 gigabytes of information (DVD-14) or 18 gigabytes (DVD-18) of information storage capacity can be made.

For the convenience of the reader, additional details regarding the manufacture and construction of DVD discs can be found in U.S. Pat. No. 5,640,382 to Florczak et al. the disclosure of which is hereby incorporated by reference.

More recently, a blue light emitting laser diode with wavelength of 400 nm has been made commercially available. The new laser will enable much denser digital video disc data storage. While current DVD using 650 nm red laser can store 4.7 GB per side. The new blue laser will enable 12 GB per side, enough storage space for about 6 hours of standard-resolution video and sound. With a multi-layer disc, there is enough capacity for a featured movie in the high-definition digital video format.

Various formats for the next generation optical discs have been proposed. One of these is referred to so as a "Blu-ray" disc. The Blu-ray disc system is characterized by a playback laser operating at a wavelength of about 405 nm (blue light) and an objective lens with a numerical aperture of 0.85. The storage capacity of this device, used with one information layer, is estimated to be about 25 gigabytes for the prerecorded format. Such devices have track pitch values in the 0.32 µm range and channel bit length on the order of 0.05 µm.

Because the focal depth of an objective lens with a NA of 0.85 is typically less than one micron, the tolerance of the optical path length variation is drastically reduced relative to currently used systems. Thus a cover layer about 100 microns thick (the distance is measured from the surface of the disc to the information layer) has been proposed. The variation of the thickness of this cover layer is extremely critical to the success of this system. For example, a 2 or 3 micron thick variation in the cover layer will introduce very high spherical aberration in the playback signal, potentially degrading the signal to an unacceptable low level.

Another major problem with the Blu-ray format is that the current generation of production equipment used for DVDs can not be used to produce discs with the Blu-ray format, because the proposed format is too different from currently used DVD format. The need to invest in new equipment to manufacture Blu-ray discs substantially increases the cost of making the Blu-ray disc, and presents another obstacle to adopting the Blu-ray disc system as the standard for the next generation of DVD.

In part, because of the aforementioned problems associated with the Blu-ray disc, another format for the next generation of DVD has been proposed. This proposed format is sometimes referred to as the "Advanced Optical Disc" (AOD).

The AOD format preserves some of the features of the currently used DVD, for example, an AOD comprises two 0.6 mm thick half-discs glued together to create a symmetrical structure. The proposed AOD system uses a playback laser with a wavelength of 405 nm and an objective lens with a NA of about 0.65. The storage capacity of the prerecorded type of AOD disc with one information layer is about 15 gigabytes. Although manufacturing an AOD disc is less complicated and less challenging than manufacturing a Blu-ray disc, AOD suffers one drawback. The playback signal quality of an AOD disc is strongly dependent upon the flatness of the disc. In order to deal with the variation of disc flatness introduced in the mass production of AOD discs, a tilt servo mechanism in the player is most likely required. The need for this mechanism will increase the cost of players designed to read AOD discs.

Currently, there is an interest in adapting CD-RW techniques to the DVD field to produce a rewritable DVD (DVD-RW) and next generation phase-change rewritable discs such as Blu-ray or AOD. Some difficulties in the production of a DVD-RW have arisen due to the higher information density requirements of the DVD format. For example, the reflectivity of the reflective layer must be increased relative to that of the standard DVD reflective layer to accommodate the reading, writing, and erasing requirements of the DVD-RW format. Also, the thermal conductivity of the reflective layer must also be increased to adequately dissipate the heat generated by both the higher laser power requirements of writing and erasing information and the microstructural changes occurring during the information transfer process. The potential choice of the reflective layer is currently pure gold, pure silver and aluminum alloys. Gold seems to have sufficient reflectivity, thermal conductivity, and corrosion resistance properties to work in a DVD-RW disk. Additionally, gold is relatively easy to sputter into a coating of uniform thickness. But once again, gold is also comparatively more expensive than other metals, making the DVD-RW format prohibitively expensive. Pure silver has higher reflectivity and thermal conductivity than gold, but its corrosion resistance is relatively poor as compared to gold. Aluminum alloy's reflectivity and thermal conductivity is considerably lower than either gold or silver, and therefore is not necessarily a good choice for the reflective layer in DVD-RW or DVD+RW.

Therefore, what is needed are alloys that have the advantages of gold when used as a reflective layers or as a semi-reflective layers in an optical storage media, but are not as expensive as gold. One aspect of this invention addresses that need.

SUMMARY OF THE INVENTION

One embodiment is an optical storage medium having a substrate with a pattern of features in at least one major surface and a recording layer adjacent to the feature pattern. A reflective layer then resides adjacent to the recording layer. The optical storage medium may also have a second substrate with a pattern of features in at least one major surface, a second recording layer adjacent to the feature pattern, and a second reflective layer adjacent to the recording layer. A space layer is then located between the first and second substrates. In one embodiment at least one of the reflective coatings is made of silver (Ag) and copper (Cu) wherein the relationship between the amounts of Ag and Cu is defined by $Ag_xCu_y$, where $0.90<x<0.999$ and $0.001<y<0.10$.

Another embodiment is an optical storage medium having a substrate with a pattern of features in at least one major surface and a recording layer adjacent to the feature pattern. A semi-reflective layer then resides adjacent to the recording layer. The optical storage medium may also have a second substrate with a pattern of features in at least one major surface, a second recording layer adjacent to the feature pattern, and a second reflective layer adjacent to the recording layer. A space layer is then located between the first and second substrates. In one embodiment at least one of the reflective or semi-reflective coatings include silver (Ag) and copper (Cu) wherein the relationship between the amounts of Ag and Cu is defined by $Ag_xCu_y$, where $0.90<x<0.999$ and $0.001<y<0.10$.

Yet another embodiment is an optical storage medium comprising a first layer have a pattern of features in at least one major surface and a semi-reflective layer or coating. The semi-reflective layer or coating includes a metal alloy that includes silver (Ag) and copper (Cu). The relationship between the amounts of Ag and Cu in the metal alloy is defined by $Ag_xCu_y$, where $0.90<x<0.9999$ and $0.0001<y<0.10$. The optical storage medium may also include a second layer having a second pattern of features in at least one major surface and a high reflective layer or coating.

Still another embodiment is an optical storage medium comprising a first layer having a pattern of features in at least one major surface and a semi-reflective layer or coating. The semi-reflective layer or coating includes a metal alloy that includes silver (Ag) and palladium (Pd). The relationship between the amounts of Ag and Pd in the metal alloy is defined by $Ag_xPd_w$ where $0.90<x<0.999$ and $0.001<w<0.10$. The optical storage medium may also include a second layer having a second pattern of features in at least one major surface and a high reflective layer or coating.

Still another embodiment is an optical storage medium comprising a first layer having a pattern of features in at least one major surface and a semi-reflective layer or coating. The semi-reflective layer or coating includes a metal alloy that includes silver (Ag) and platinum (Pt). The relationship between the amounts of Ag and Pt in the metal alloy is defined by $Ag_xPt_z$ where $0.95<x<0.999$ and $0.001<z<0.05$. The optical storage medium may also include a second layer having a second pattern of features in at least one major surface and a high reflective layer or coating.

Yet another embodiment is an optical storage medium comprising a first layer having a pattern of features in at least one major surface and a semi-reflective layer or coating. The semi-reflective layer or coating includes a metal alloy that includes silver (Ag), copper (Cu) and platinum (Pt). The relationship between the amounts of Ag, Cu and Pt in the metal alloy is defined by $Ag_xCu_yPt_z$ where $0.85<x<0.9989$; $0.0001<y<0.10$; and $0.001<z<0.05$. The optical storage medium may also include a second layer having a second pattern of features in at least one major surface and a high reflective layer or coating.

Yet another embodiment is an optical storage medium comprising a first layer having a pattern of features in at least one major surface and a semi-reflective layer or coating. The semi-reflective layer or coating includes a metal alloy that includes silver (Ag), copper (Cu) and palladium (Pd). The relationship between the amounts of Ag, Cu and Pd in the metal alloy is defined by $Ag_xCu_yPd_w$ where $0.80<x<0.9989$; $0.0001<y<0.10$; and $0.001<w<0.10$. The optical storage medium may also include a second layer having a second pattern of features in at least one major surface and a high reflective layer or coating.

Still another embodiment is an optical storage medium comprising a first layer having a pattern of features in at least one major surface and a semi-reflective layer or coating. The semi-reflective layer or coating includes a metal alloy that includes silver (Ag), copper (Cu) and gold (Au). The relationship between the amounts of Ag, Cu and Au in the metal alloy is defined by $Ag_xCu_yAu_v$ where $0.80<x<0.9989$; $0.0001<y<0.10$ and $0.001<v<0.10$. The optical storage medium may also include a second layer having a second pattern of features in at least one major surface and a high reflective layer or coating.

Yet another embodiment is an optical storage medium comprising a first layer having a pattern of features in at least one major surface and a semi-reflective layer or coating. The semi-reflective layer or coating includes a metal alloy that includes silver (Ag), copper (Cu), palladium (Pd) and platinum (Pt). The relationship between the amounts of Ag, Cu, Pd and Pt in the metal alloy is defined by $Ag_xCu_yPt_zPd_w$ where $0.75<x<0.9979$, $0.0001<y<0.10$, $0.001<z<0.05$, and $0.001<w<0.10$. The optical storage medium may also include a second layer having a second pattern of features in at least one major surface and a high reflective layer or coating.

Another embodiment is an optical storage medium comprising a first layer having a pattern of features in at least one major surface and a semi-reflective layer or coating. The semi-reflective layer or coating includes a metal alloy that includes copper (Cu) and silver (Ag) The relationship between the amounts of Cu and Ag in the metal alloy is defined by $Cu_yAg_x$ where $0.95<y<0.9999$, $0.0001<x<0.05$. The optical storage medium may also include a second layer having a second pattern of features in at least one major surface and a high reflective layer or coating.

Still another embodiment is an optical storage medium comprising a first layer having a pattern of features in at least one major surface and a semi-reflective layer or coating. The semi-reflective layer or coating includes a metal alloy that includes copper (Cu) and magnesium (Mg) The relationship between the amounts of Cu and Mg in the metal alloy is defined by $Cu_yMg_q$ where $0.90<y<0.999$, $0.001<q<0.10$. The optical storage medium may also include a second layer having a second pattern of features in at least one major surface and a high reflective layer or coating.

Still another embodiment is an optical storage medium comprising a first layer having a pattern of features in at least one major surface and a semi-reflective layer or coating. The semi-reflective layer or coating includes a metal alloy that includes copper (Cu) and zinc (Zn). The relationship between the amounts of Cu and Zn in the metal alloy is defined by $Cu_yZn_m$ where $0.90<y<0.999$, $0.001<m<0.10$. The optical storage medium may also include a second layer having a second pattern of features in at least one major surface and a high reflective layer or coating.

Still another embodiment is an optical storage medium comprising a first layer having a pattern of features in at least one major surface and a semi-reflective layer or coating. The semi-reflective layer or coating includes a metal alloy that includes copper (Cu) and aluminum (Al). The relationship between the amounts of Cu and Al in the metal alloy is defined by $Cu_yAl_n$ where $0.80<y<0.999$, $0.001<n<0.20$. The optical storage medium may also include a second layer having a second pattern of features in at least one major surface and a high reflective layer or coating.

Another embodiment is an optical storage medium comprising a first layer having a pattern of features in at least one major surface and a semi-reflective layer adjacent to the first feature pattern. The semi-reflective layer or coating can be comprised of any of the metal alloys of the invention suitable for use in a semi-reflective layer and compatible for use with a laser in the range of 405 nm. The storage medium further includes a second layer having a pattern of features in at least one major surface and a highly reflective layer or coating adjacent to the second pattern of features. In one embodiment of the invention the first pattern of features includes a spiral groove.

Yet another embodiment is an optical storage device including, in addition to a first layer and second layer each having feature patterns, a fourth layer including an optically recordable material positioned between a third layer including a dielectric material and a fifth layer including a dielectric material. Optical recording layer 4 and dielectric layers 3 and 5 are positioned between the first layer and the second layer. In one embodiment of the invention the feature pattern in either, or both, the first and second layers comprise a spiral groove either with or without data pits.

In one embodiment the recordable material in layer 4 is a phase changeable material.

In still another embodiment the recordable material in layer 4 is a magnetic optical recordable material.

In yet another embodiment the recordable material in layer 4 is an optically active dye.

One embodiment provides metallic alloys for use as thin film reflective layers in optical recording devices. These alloys have high reflectivity and sputtering characteristics similar to the sputtering characteristics of gold, and they are corrosion resistant and less expensive than gold. When a layer of these alloys is made thin enough, they can be sufficiently semi-reflective and transmissive to laser light for use in multi layer optical storage devices such, for example, dual layer DVDs.

Another embodiment is a class of copper containing alloys with moderate to high reflectivity and good corrosion resistance for use as thin film reflective layers in optical storage devices.

Yet another embodiment provides silver and or copper alloys that are lower cost alternatives to the use of gold in the reflective or semi-reflective layers of recordable compact disc and that still satisfy other functional requirements of the discs such as high reflectivity and corrosion resistance.

Still another embodiment provides silver and/or copper alloys for use as the reflective or semi-reflective layers in various versions of the prerecorded mini-disc (MD) and other current or future generations of optical discs in which reflectivity, corrosion resistance, and ease of application are all important requirements for a low cost and high performance product.

DESCRIPTION OF THE PREFERRED EMBODIMENTS

Figure 1:
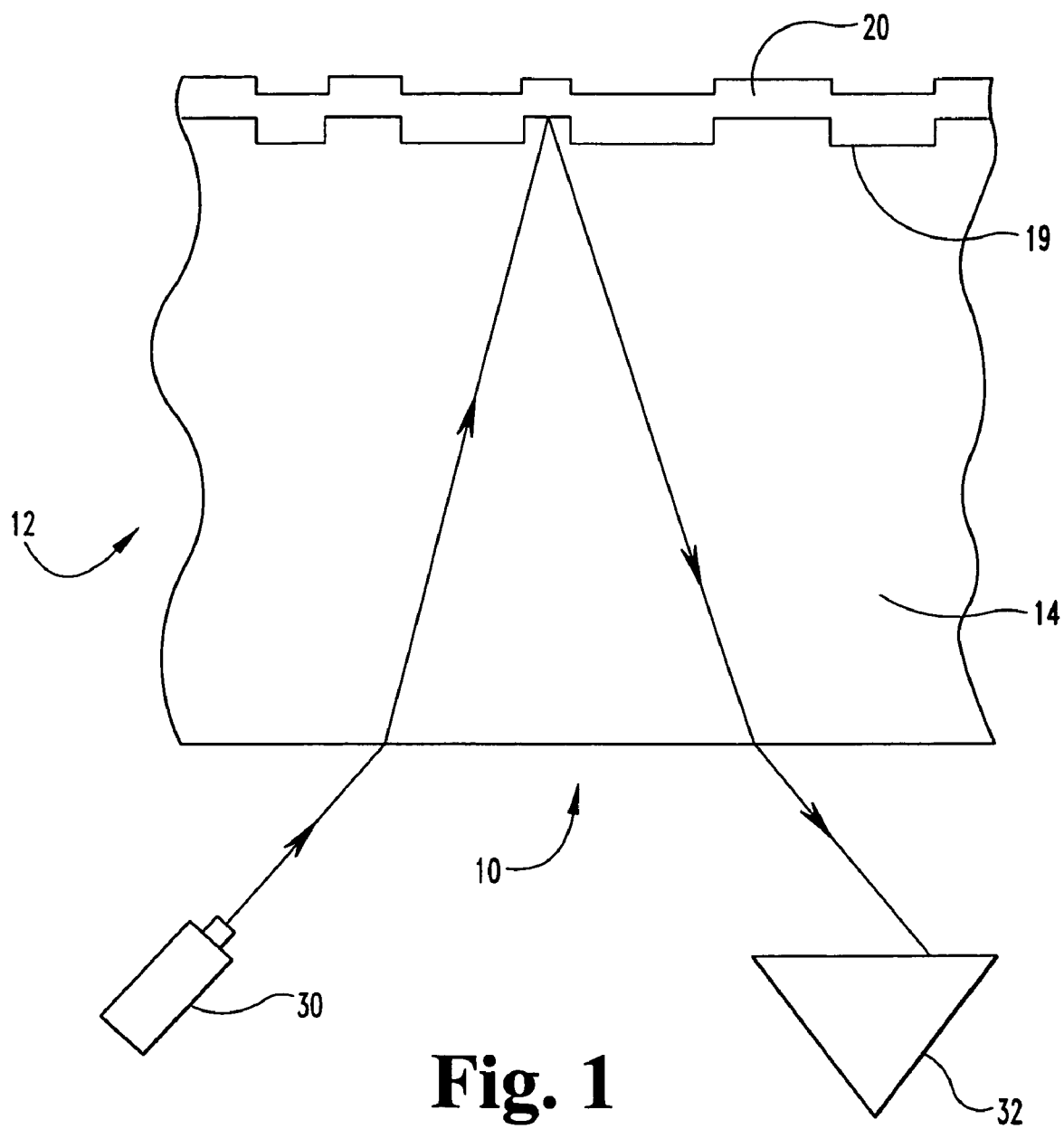
FIG. 1 illustrates an optical storage system according to one embodiment.

Specific language is used in the following description and examples to publicly disclose the invention and to convey its principles to others. No limits on the breadth of the patent rights based simply on using specific language are intended. Also included are any alterations and modifications to the descriptions that should normally occur to one of average skill in this technology.

As used in this specification the term "atomic percent" or "a/o percent" refers to the amount of a particular metal or the amount of a group of particular metals that is present in a particular alloy based upon the number of that metal's atoms that are present, or the number of that group's atoms that are present, whichever the case may be. For example, an alloy that is 15 atomic percent metal "A" and 85 atomic percent metal "B" could also be referenced by a formula for that particular alloy: $A_{0.15}B_{0.85}$.

As used herein the term "of the amount of silver present" is used to describe the amount of a particular additive that is included in the alloy. Used in this fashion, the term means that the amount of silver present, without consideration of the additive, is reduced by the amount of the additive that is present to account for the presence of the additive in a ratio. For example, if the relationship between Ag and an element "X" is $Ag_{0.85} X_{0.15}$ (respectively 85 a/o percent and 15 a/o percent) without the considering the amount of the additive that is present, and if an additive "B" is present at a level 5 atomic percent "of the amount of silver present"; then the relationship between Ag, X, and B is found by subtracting 5 atomic percent from the atomic percent of silver, or the relationship between Ag, X, and B is $Ag_{0.80} X_{0.15} B_{0.05}$ (respectively 80 a/o percent silver, 15 a/o percent "X", and 5 a/o percent "B").

As used in this specification the term "adjacent" refers to a spatial relationship and means "nearby" or "not distant." Accordingly, the term "adjacent" as used in this specification does not require that items so identified are in contact with one another and that they may be separated by other structures. For example, referring to FIG. 4, layer 324 is "adjacent" or "nearby" layer 322, just as layer 314 is "adjacent" or "nearby" layer 322.

Metal alloys for use in optical recording devices have been disclosed in U.S. Pat. Nos. 6,007,889, 6,280,811, 6,451,402 B1, 6,544,616 B2, 6,764,735 and U.S. patent application Ser. No. 10/342,649 to Nee, which are hereby incorporated by reference in their entirety.

One embodiment comprises multi-layer metal/substrate compositions that are used as optical data storage media. One embodiment is illustrated in FIG. 1 an optical data storage system 10. Optical storage medium 12 comprises a transparent substrate 14, and a highly reflective thin film layer 20 on a first data pit pattern 19. An optical laser 30 emits an optical beam toward medium 12, as shown in FIG. 1. Light from the optical beam that is reflected by thin film layer 20 is sensed by detector 32, which senses modulations in light intensity based on the presence or absence of a pit or land in a particular spot on the thin film layers. The disc is unique in that one of the alloys presented below is deposited upon the information pits and lands and is used as the highly reflective thin film 20. In one alternative (not shown), the disc may be varied by attaching two optical storage media 12 back-to-back, that is, with each transparent substrate 14 facing outward.

Figure 2:
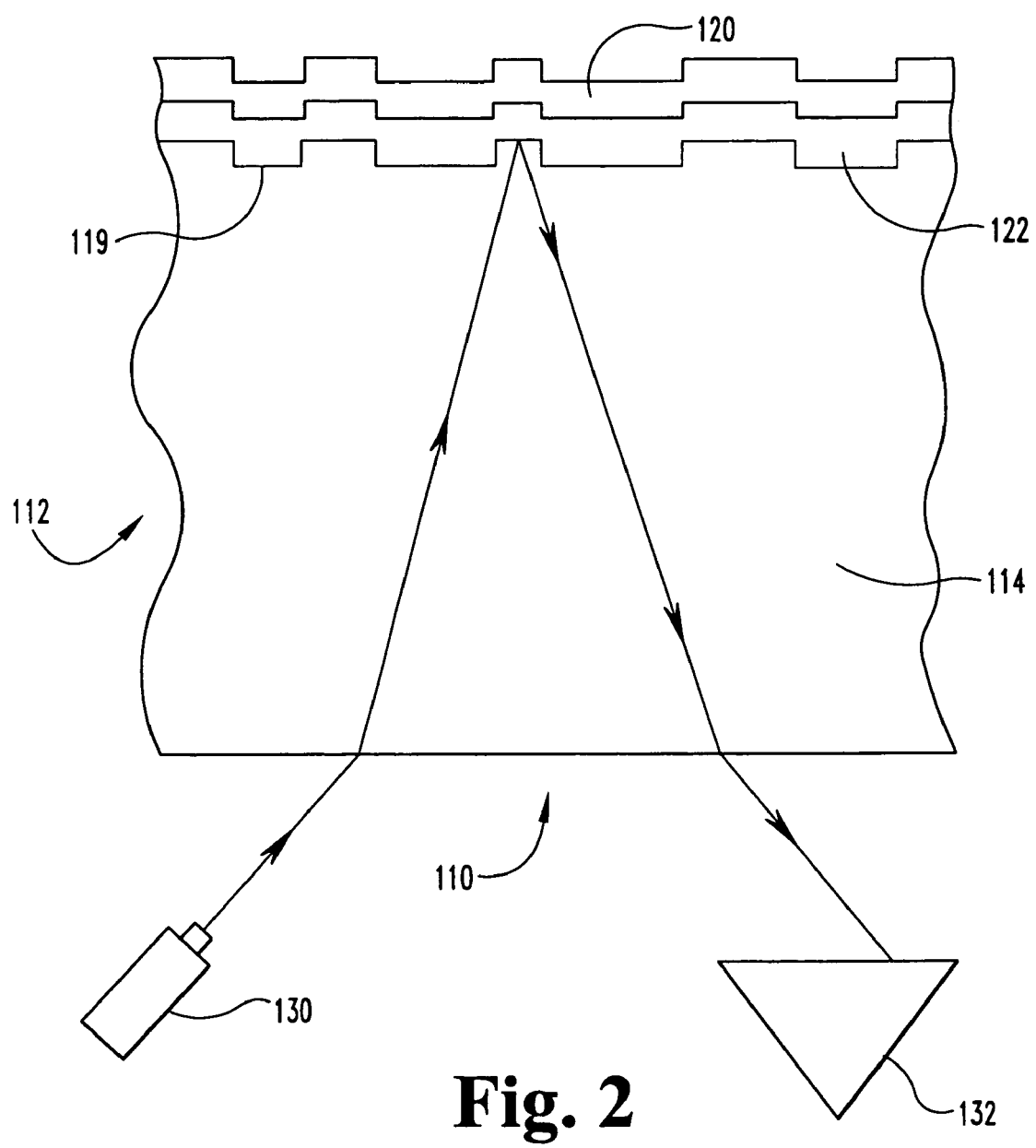
FIG. 2 illustrates an optical storage system according to another embodiment, wherein an organic dye is used as a recording layer.

Another embodiment is illustrated in FIG. 2, an optical data storage system 110. Optical storage medium 112 comprises a transparent substrate 114, and a highly reflective thin film layer 120, over a layer of dye 122, placed over a first pattern 119. An optical laser 130 emits an optical beam toward medium 112, as shown in FIG. 2. As discussed earlier, data is placed upon the disc by deforming portions of the dye layer with a laser. Thereafter, the disc is played by light from the optical beam, which is reflected by thin film layer 120 and sensed by detector 132. Detector 132 senses modulations in light intensity based on the presence or absence of a deformation in the dye layer. The disc is unique in that one of the alloys presented below is deposited over the dye layer 122 and is used as the highly reflective thin film 120. In one alternative (not shown), the disc may be varied by attaching two optical storage media 112 back-to-back, that is, with each transparent substrate 114 facing outward.

Figure 3:
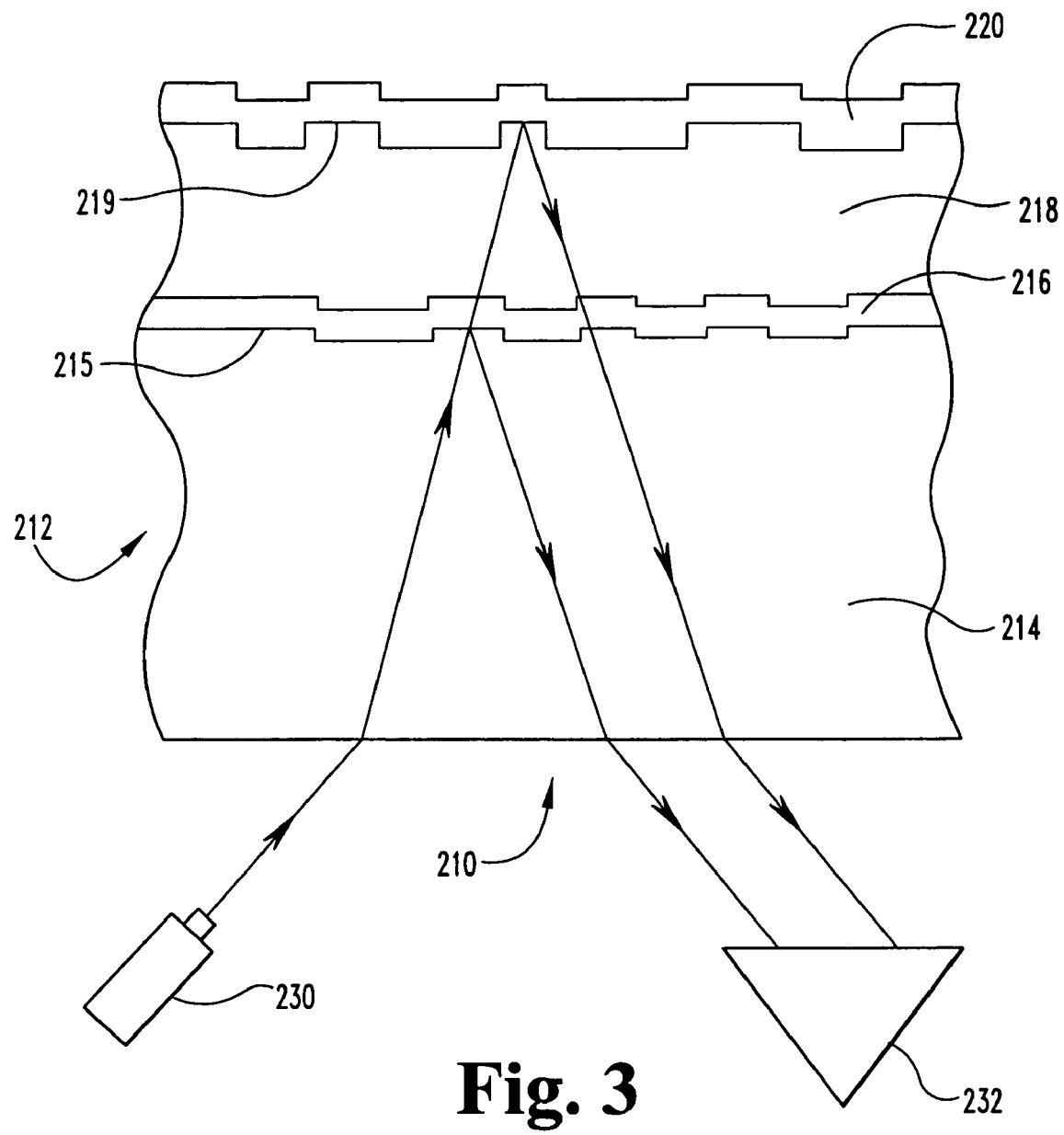
FIG. 3 illustrates another embodiment, an optical storage system having two layers of information pits, wherein playback of both layers is from one side.

Still another embodiment is illustrated in FIG. 3, an optical data storage system 210. Optical storage medium 212 comprises a transparent substrate or layer 214, a partially reflective thin film layer 216 on a first data pit pattern 215, a transparent spacer layer 218, and a highly reflective thin film layer 220 on a second data pit pattern 219. An optical laser 230 emits an optical beam toward medium 212, as shown in FIG. 3. Light from the optical beam that is reflected by either thin film layer 216 or 220, is sensed by detector 232, which senses modulations in light intensity based on the presence or absence of a pit in a particular spot on the thin film layers. The disc is unique in that one of the alloys presented below is deposited upon the information pits and lands and used as the highly reflective thin film 220 or semi-reflective layer 216.

Figure 4:
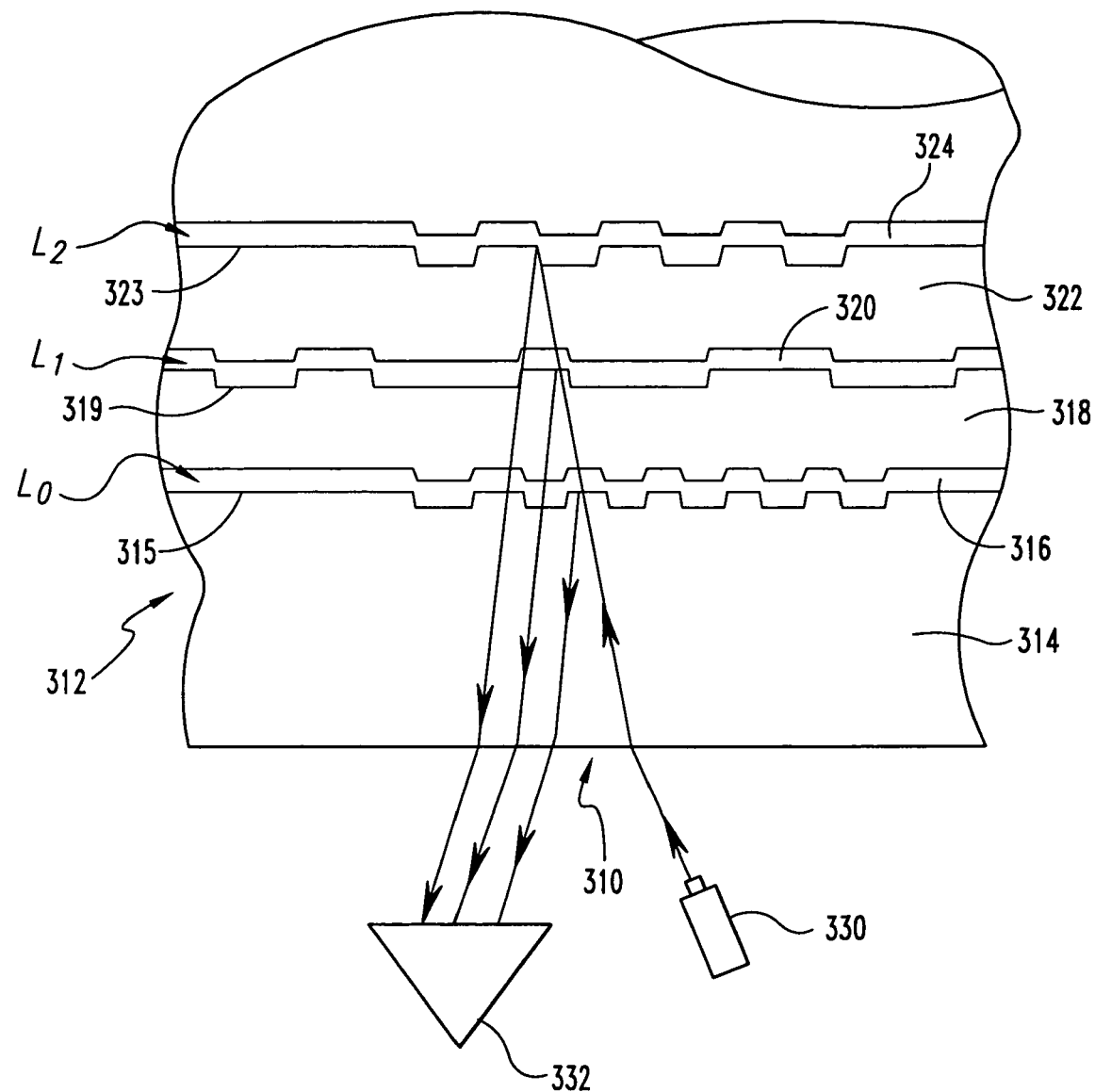
FIG. 4 illustrates another embodiment, an optical storage system having three layers of information pits, wherein playback of all three layers is from one side.

Yet another embodiment is illustrated in FIG. 4, as optical data storage system 310. Optical storage medium 312 comprises a transparent substrate or layer 314, a partially reflective thin film layer 316 or layer "zero" on a first data pit pattern 315, a transparent spacer layer 318, another partially reflective thin film layer 320 or layer "one" on a second data pit pattern 319, a second transparent spacer layer 322, and a highly reflective thin film layer 324 or layer "two" on a third pit pattern 323. An optical laser 330 emits an optical beam toward medium 312, as shown in FIG. 4. Light from the optical beam that is reflected by thin film layer 316, 320 or 324 is detected by detector 332, which senses modulation in light intensity based on the presence or absence of a pit in a particular spot on the thin film layers. The disc is unique in that at least one alloy in a number of alloys presented below can be deposited upon the information pits and lands and used as the highly reflective thin film 324 or the semi-reflective layer 316 and 320. To playback the information on Layer 2, the light beam from laser diode 330 is going through the transparent polycarbonate substrate, passing through the first semi-reflective Layer 0, and the second semi-reflective Layer 1 and then reflected back from layer 2 to the detector 332.

As used herein, the term "reflectivity" refers to the fraction of optical power incident upon, for example, transparent substrates 14, 114, 214 or 314 which, when focused to a spot on a flat region of layer 20, 120, 216, 220, 316, 320, or 324 could in principle, be sensed by a photodetector in an optical readout device. It is assumed that the readout device includes a laser, an appropriately designed optical path, and a photodetector.

This invention is based, in part, on the observation that particular silver-based, and copper-based, alloys provide sufficient reflectivity and semi-corrosion resistance to be used as the reflective or the semi-reflective layers in optical storage media, without the inherent cost of a gold-based alloy.

In one embodiment, silver is alloyed with a comparatively small amount of gold. In this embodiment, the relationship between the amounts of gold and silver ranges from about 0.1 a/o percent (atomic percent) to about 10 a/o percent gold and from about 90 a/o percent to about 99.9 a/o percent silver. But preferably in respect to each metal, the alloy has from about 0.1 a/o percent to about 5.0 a/o percent gold and from about 95.0 a/o percent to about 99.9 a/o percent silver.

In another embodiment, silver is alloyed with a comparatively small amount of palladium. In this embodiment, the relationship between the amounts of palladium and silver ranges from about 0.1 a/o percent (atomic percent) to about 10 a/o percent palladium and from about 90 a/o percent to about 99.9 a/o percent silver. But preferably in respect to each metal, the alloy has from about 0.1 a/o percent to about 5.0 a/o percent palladium and from about 95 a/o percent to about 99.9 a/o percent silver.

In another embodiment, silver is alloyed with a comparatively small amount of platinum. In this embodiment, the relationship between the amounts of platinum and silver ranges from about 0.1 a/o percent (atomic percent) to about 5.0 a/o percent platinum and from about 95 a/o percent to about 99.9 a/o percent silver. But preferably in respect to each metal, the alloy has from about 0.1 a/o percent to about 2.5 a/o percent platinum and from about 97.5 a/o percent to about 99.9 a/o percent silver.

In another embodiment, silver is alloyed with a comparatively small amount of copper. In this embodiment, the relationship between the amounts of copper and silver ranges from about 0.01 a/o percent (atomic percent) to about 10 a/o percent copper and from about 90 a/o percent to about 99.99 a/o percent silver. Preferably, in respect to each metal, the alloy has from about 0.1 a/o percent to about 5.0 a/o percent copper and from about 95 a/o percent to about 99.9 a/o percent silver.

In another embodiment, silver is alloyed with a comparatively small amount of both copper and platinum. In this embodiment, the relationship between the amounts of platinum, copper and silver ranges from 0.1 a/o percent to 5.0 a/o percent platinum, 0.01 a/o percent to about 10 a/o percent copper and from about 85 a/o percent to about 99.89 a/o percent silver.

In still another embodiment, silver is alloyed with a comparatively small amount of both gold and palladium. In this embodiment, the relationship between the amounts of gold, palladium and silver ranges from about 0.1 a/o percent to about 10 a/o percent gold, from about 0.1 a/o percent to about 10 a/o percent palladium, and from about 80 a/o percent to about 99.8 a/o percent silver. But preferably in respect to each metal, the alloy has from about 0.1 a/o percent to about 5.0 a/o percent gold, from about 0.1 a/o percent to about 5.0 a/o percent palladium, and from about 90 a/o percent to about 99.8 a/o percent silver.

In still another embodiment, silver is alloyed with a comparatively small amount of beryllium. In this embodiment, the relationship between the amounts of beryllium and silver ranges from about 0.01 a/o percent to about 10 a/o percent beryllium, and from about 90 a/o percent to about 99.99 a/o percent silver. But preferably in respect to each metal, the alloy has from about 0.1 a/o percent to about 6 a/o percent beryllium, and from about 94 a/o percent to about 99.9 a/o percent silver.

The reflectivity of the above-described binary or ternary alloy systems can be adjusted by changing the concentration of each element. Because this ternary alloy system of silver, gold and palladium is isomorphous, there is no metallurgical difficulty in mixing the metals in any combination of concentrations to keep all the solutes in a single-phase solid solution. A single-phase alloy not only eliminates the chance of ejecting second phase particles during the sputtering process, but also minimizes any potential preferential corrosion sites in the thin film deposited on the optical disc.

The above-described binary or ternary alloy systems can be further modified by adding another element such as copper, which has an intrinsic reflectivity of more than 90 percent, or rhodium, which has an intrinsic reflectivity of about 80 percent. Copper is isomorphous with gold and palladium, but its solubility in silver is somewhat limited. Rhodium is isomorphous with palladium, but has very limited solubility in silver and gold. Therefore, if a single phase solid solution microstructure is desired in the sputtering target, the addition of copper or rhodium to the above silver-based binary or ternary alloy systems is limited to their respective solubility limits, which is about 5 a/o percent or less. However, this 5 a/o percent limit can be exceeded if a fast cooling rate is used both to make the sputtering target and to apply the target as a reflective film. Thus, in total, the preferred concentration of copper or rhodium as an additive to the above-described silver-based, binary or ternary alloy systems can exceed 5 a/o percent and is from about 0.01 a/o percent to about 10.0 a/o percent.

In another embodiment the silver-based, binary and ternary alloy systems are further alloyed with ruthenium, osmium, iridium, platinum, rhodium, beryllium and copper or mixtures of these metals. If one or a mixture of these metals replaces a portion of the silver in the alloy, the corrosion resistance of the resultant thin film will increase; however, the reflectivity will also drop. In relation to the amount of silver that is present in the above binary or ternary alloy systems, the amount of the above-identified metal that may be preferably added ranges from about 0.01 a/o percent to about 5.0 a/o percent of the silver content.

In still another embodiment the sputtering target is silver alloyed with a comparatively small addition of both palladium and copper. In this embodiment, the relationship between the amounts of silver, palladium and copper ranges from about 0.1 a/o percent to about 10.0 a/o percent palladium, from about 0.01 a/o percent to about 10.0 a/o percent copper and from about 80.0 a/o percent to about 99.98 a/o percent silver. But preferably in respect to each metal, the alloy has from about 0.1 a/o percent to about 5.0 a/o percent palladium, from about 0.1 a/o percent to about 5.0 a/o percent copper, and from about 90.0 a/o percent to about 99.8 a/o percent silver. This silver, palladium and copper ternary alloy can be further alloyed with ruthenium, osmium, iridium, platinum, rhodium and beryllium or mixtures of these metals. In relation to the amount of silver that is present in the above silver, palladium and copper ternary alloy, the amount of the above-identified metal that may be preferably added ranges from 0.01 a/o percent to about 5.0 a/o percent of the silver content.

In a second aspect, this invention is also based in part on the observation that some copper-based alloys provide sufficient reflectivity and corrosion resistance to be used as the reflective or semi-reflective layers in optical storage mediums, without the inherent cost of a gold-based alloy.

In one embodiment, copper is alloyed with a comparatively small amount of silver. In this embodiment, the relationship between the amounts of silver and copper ranges from about 0.01 a/o percent (atomic percent) to about 5 a/o percent silver and from about 95 a/o percent to about 99.99 a/o percent copper.

Figure 7:
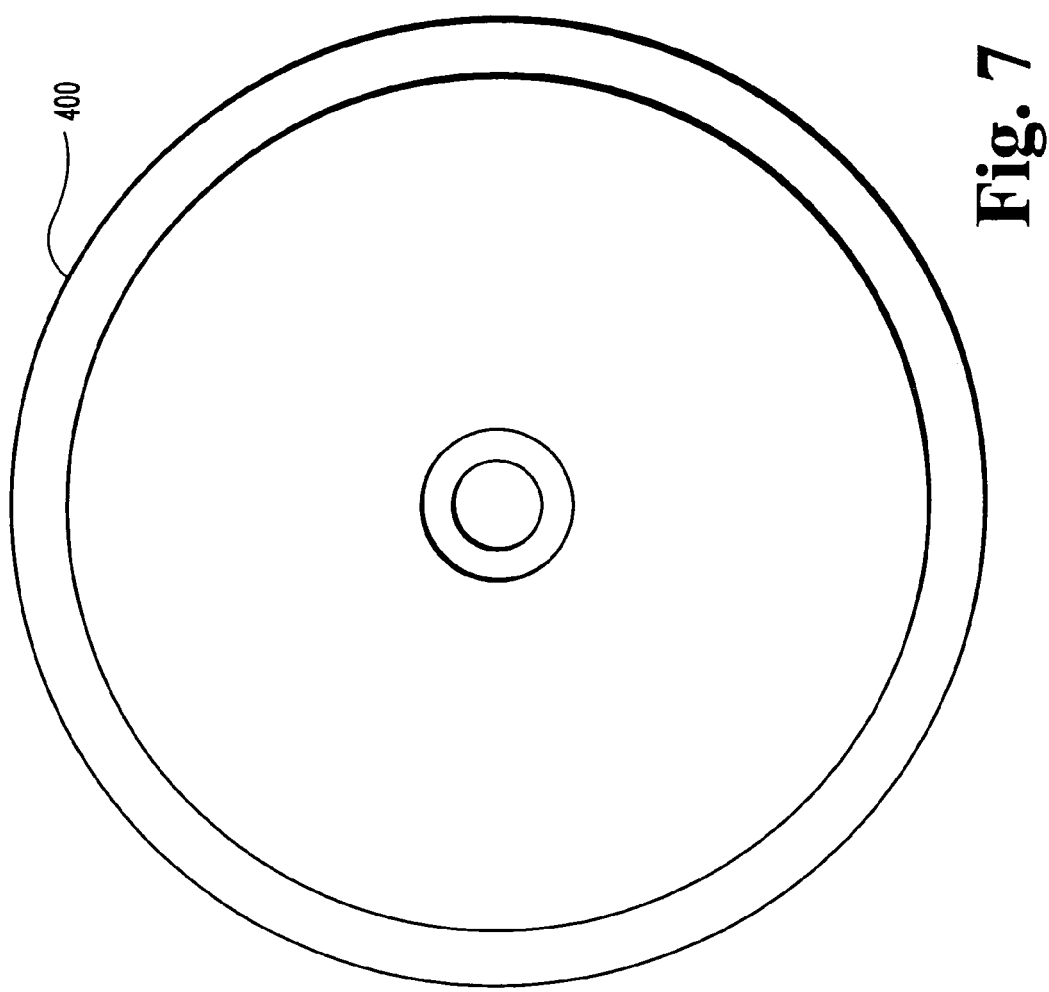
FIGS. 7 and 8 illustrate respectively the front and side view of a sputtering target that can be used to create reflective or semi-reflective layers on feature patterns.
Figure 8:
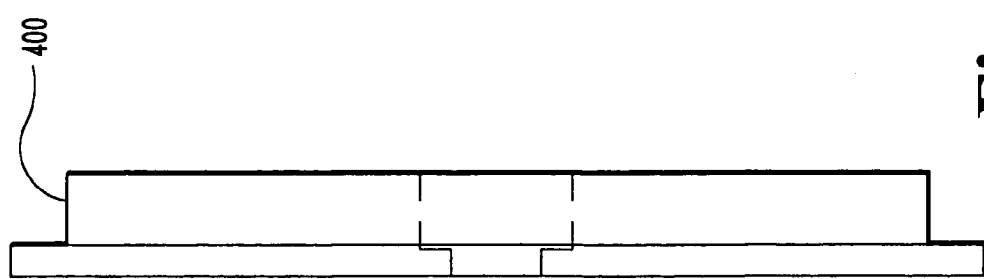

In the fabrication process of a sputtering target (item 400, for example, illustrated in FIGS. 7 and 8), a fast cooling rate is necessary to quench the liquid melt into a solid and prevent the silver from precipitating in the copper matrix. And in this regard, it is then preferred that the silver concentration in relation to the copper is kept from about 0.01 a/o percent to about 4.0 a/o percent. This includes all the commercial alloys of the oxygen-free silver-bearing copper with the Unified Number System designation C10400, C10500, C10600, and C10700 with minimum silver content of 0.027, 0.034, 0.054, and 0.085 weight percent, all the commercial silver-bearing tough pitch copper with UNS No. C11300, C11400, C11500, and C11600, and all the commercial alloys of the fire-refined tough pitch silver-bearing copper with UNS No. C12700, C12800, C12900 and C13000.

In another embodiment, copper is alloyed with a comparatively small amount of cadmium, which is an oxide former and an oxygen scavenger that will improve the oxidation resistance of copper while having only a small impact on reflectivity. In this embodiment, the relationship between the amount of cadmium and copper ranges from about 0.01 a/o percent (atomic percent) to about 15 a/o percent cadmium and from about 85 a/o percent to about 99.99 a/o percent copper.

The solubility limits of cadmium in copper at 500° C. and 300° C. are about 1.40 and 0.50 a/o percent respectively. And at the eutectic temperature of copper and cadmium, the maximum solubility of cadmium in copper is approximately 2.14 a/o percent. Thus, for the same reasons as for the copper-silver alloys, it is again desirable to keep the cadmium in a solid solution of copper for use as a sputtering target (an example of which is item 400 shown in FIGS. 7 and 8). As a result, in still another embodiment, cadmium is added to copper preferably in the range of 0.1 a/o percent to 5.0 a/o percent. This range includes the commercial alloys of the so-called anneal-resistant electrolytic copper of UNS C11100 with about 0.01-wt. percent cadmium and about 0.04-wt. percent oxygen. And further includes the commercial alloys of cadmium and copper with UNS numbers C14300 and C14310 with cadmium concentrations in the range of 0.05 wt. percent to 0.15 wt. percent for C14300 and 0.10 to 0.31 wt. percent cadmium for C14310 respectively. And these still further include the commercial cadmium and copper alloys of C16200 with 0.70 wt. percent to 1.20 wt. percent cadmium.

In still another embodiment, copper is alloyed with a comparatively small amount of gold. Gold is a noble metal, and will increase the corrosion resistance of copper. Gold is isomorphous with copper and can be added in any proportion to copper and still keep the copper-gold alloy a single phase; thus gold's addition to copper as an alloying element is theoretically unlimited and only limited in practice by the ultimate cost of the alloy. In this embodiment, the relationship between the amounts of gold and copper ranges from about 0.01 a/o percent (atomic percent) to about 30 a/o percent gold, and from about 70 a/o percent to about 99.99 a/o percent copper. But preferably, in respect to each metal, this alloy has from about 0.1 a/o percent to about 5.0 a/o percent gold and from 95 a/o percent to about 99.9 a/o percent copper.

In another embodiment, copper is alloyed with a comparatively small amount of magnesium. In this embodiment, the relationship between the amount of magnesium and copper ranges from about 0.01 a/o percent (atomic percent) to about 10 a/o percent magnesium and from about 90 a/o percent to about 99.99 a/o percent copper. But preferably, in respect to each metal, this alloy has from about 0.10 a/o percent to about 5.0 a/o percent magnesium and from about 95 a/o percent to about 99.9 a/o percent copper. Similar to cadmium, magnesium is also a strong oxide former and oxygen scavenger, and is, therefore, capable of reacting with any residual oxygen in copper to form magnesium oxide.

In still another embodiment, copper is alloyed with a comparatively small amount of aluminum. Aluminum will improve the corrosion resistance of copper and slow the rate of oxide formation. In this embodiment, the relationship between the amounts of aluminum and copper ranges from about 0.01 a/o percent (atomic percent) to about 10 a/o percent aluminum and from about 90 a/o percent to about 99.99 a/o percent copper. But preferably, in respect to each metal, this alloy has from about 0.1 a/o percent to about 5 a/o percent aluminum and from 95 a/o percent to 99.9 a/o percent copper. This range includes the commercial alloys C 60800 and C 61000, commonly known as 5 percent and 8 percent aluminum bronze with an aluminum concentration of about 5 percent and 8 percent by weight.

In yet another embodiment, copper is alloyed with a comparatively small amount of nickel, which will improve the corrosion resistance of copper. In this embodiment, the relationship between the amounts of nickel and copper ranges from about 0.01 a/o percent (atomic percent) to about 13 a/o percent nickel, and from about 87 a/o percent to about 99.99 a/o percent copper. This includes the commercial alloy C 70600, commonly known as 90-10 cupronickel.

In another embodiment, copper is alloyed with a comparatively small amount of beryllium, which will improve the corrosion resistance of copper. In this embodiment, the relationship between the amounts of beryllium and copper ranges from about 0.01 a/o percent (atomic percent) to about 10 a/o percent beryllium, and from about 90 a/o percent to about 99.99 a/o percent copper.

In still another embodiment, copper is alloyed with a comparatively small amount of zirconium, which will improve the corrosion resistance of copper. In this embodiment, the relationship between the amounts of zirconium and copper ranges from about 0.01 a/o percent (atomic percent) to about 5 a/o percent zirconium, and from about 95 a/o percent to about 99.99 a/o percent copper. In still another embodiment, copper is alloyed with small amount of zinc, which will improve the corrosion resistance of copper. In this embodiment, the relationship between the amount of zinc and copper ranges from about 0.01 a/o percent to about 10 a/o percent zinc, and from about 90 a/o percent to about 99.99 a/o percent copper. More preferably, the amount of zinc in copper is in the range of about 0.1 a/o percent to about 5.0 a/o percent.

In addition to all the above-described binary alloys, copper may also be alloyed with two or more of the foregoing metals. For example, nickel may also be included in combination with the above-described copper-aluminum alloy such as the commercial alloy C 61500 with nominal composition limits of aluminum from approximately 7.7 percent to approximately 8.3 percent by weight, and nickel from approximately 1.8 percent to approximately 2.2 percent by weight.

For the convenience of the reader, the following are some combinations of metals, where the metals are identified by their periodic table symbols, which may be preferably alloyed with copper: Ag, or Au, or Be, or Cd, or Mg, or Al, or Ni, or Zr, or Ag+Cd, or Ag+Be, or Ag+Mg, or Cd+Mg, or Al+Ni; or Ag+Cd+Mg, or Ag+Cd+Ni, or Ag+Cd+Al, or Ag+Mg+Ni, or Ag+Mg+Al, or Ag+Ni+Al, or Ag+Mg+Be, or Cd+Mg+Ni, or Cd+Mg+Al, or Be+Ni+Al, or Cd+Ni+Al, or Mg+Ni+Al; or Ag+Cd+Mg+Ni, or Ag+Cd+Mg+Al, or Ag+Cd+Ni+Al, or Ag+Mg+Ni+Al; or Ag+Mg+Ni+Be, or Ag+Be +Al+Ni.

But in general, silver, cadmium, gold, magnesium, aluminum, beryllium, zirconium and/or nickel may be alloyed with copper as a combination of two, three, four, five, six, seven, or all eight metals from about 0.01 a/o percent up to about 15 a/o (atomic percent) in relation to the amount of copper present. In other words, the total amount of these metals may range from 0.01 a/o percent to about 15 a/o and copper may range from about 85 a/o percent to about 99.99 a/o percent. But preferably, these metals range from about 0.1 a/o percent to about 6 a/o percent and copper ranges from about 94 a/o percent to about 99.9 a/o percent.

An example of a copper alloy system which includes most of the above-mentioned element additions with substantially improved corrosion resistance over pure copper and with suitable reflectivity and reasonably low cost is the following composition (amounts given in atomic percent): silver 0.2 percent, cadmium 0.3 percent, magnesium 1.0 percent, aluminum 1.2 percent, and nickel 0.8 percent with all other impurities less than 0.1 percent, and the balance copper. This alloy will have a reflectivity from approximately 82 percent to 92 percent at 780 nm wavelength depending on the manufacturing method used to make the alloy, and the conditions it is used in optical discs or other devices requiring reflective thin-films.

Having presented the preceding compositions for the starting materials, it is important to recognize that both the manufacturing process of the sputtering target (FIG. 7) and the process to deposit the target material into a thin film play important roles in determining the final properties of the film.

To this end, a preferred method of making the sputtering target 400 (shown in FIG. 7) will now be described. In general, vacuum melting and casting of the alloys or melting and casting under protective atmosphere, are preferred in order to minimize the introduction of other unwanted impurities.

The preferred vacuum melting process is by high frequency induction electric furnace with high strength graphite crucibles. Typically a carefully weighted charge of starting materials sometimes including used sputtering targets is put in the crucible and the vacuum is drawn. After suitable vacuum is reached, the furnace is back filled with an inert gas such as argon, and then the high frequency induction current is turned on to melt the charge. No mechanical stirring of the melt to mix the charge is necessary as the induction current provides powerful mixing. Mechanical means can be provided in the vacuum furnace to pour and cast the melt into graphite molds in the shape of sputtering targets.

Afterwards, the as-cast ingot should undergo a cold working process to break down the segregation and the non-uniform as-cast microstructure. One preferred method is cold forging or cold uniaxial compression with more than 50 percent of thickness reduction, followed by annealing to recrystallize the deformed material into fine equi-axed grain structure with preferred texture of <1,1,0> orientation. This texture promotes directional sputtering in a sputtering apparatus so that more of the atoms from the sputtering target will be deposited onto the disc substrates for more efficient use of the target material.

Alternatively, a cold multi-directional rolling process of more than 50 percent thickness reduction can be employed, followed by annealing to promote a random oriented microstructure in the target and finally by machining to the final shape and size suitable for a given sputtering apparatus. This target with random crystal orientation will lead to a more random ejection of atoms from the target during sputtering and a more uniform thickness distribution in the disc substrate.

Depending on different discs, optical, and other system requirements, either a cold forging or a cold multi-directional rolling process can be employed in the target manufacturing process to optimize the optical performance and other performance requirements of the thin film in a given application.

The alloys of this invention can be deposited in the well-known manners described earlier. Those being sputtering, thermal evaporation or physical vapor deposition, and possibly electrolytic or electroless plating processes. Depending on the method of application, the alloy thin film's reflectivity could vary. Any application method that adds impurities to or changes the surface morphology of the thin film layer on the disc could conceivably lower the reflectivity of the layer. But to the first order of approximation, the reflectivity of the thin film layer on the optical disc is primarily determined by the starting material of the sputtering target, evaporation source material, or the purity and composition of the electrolytic and electroless plating chemicals.

Figure 5:
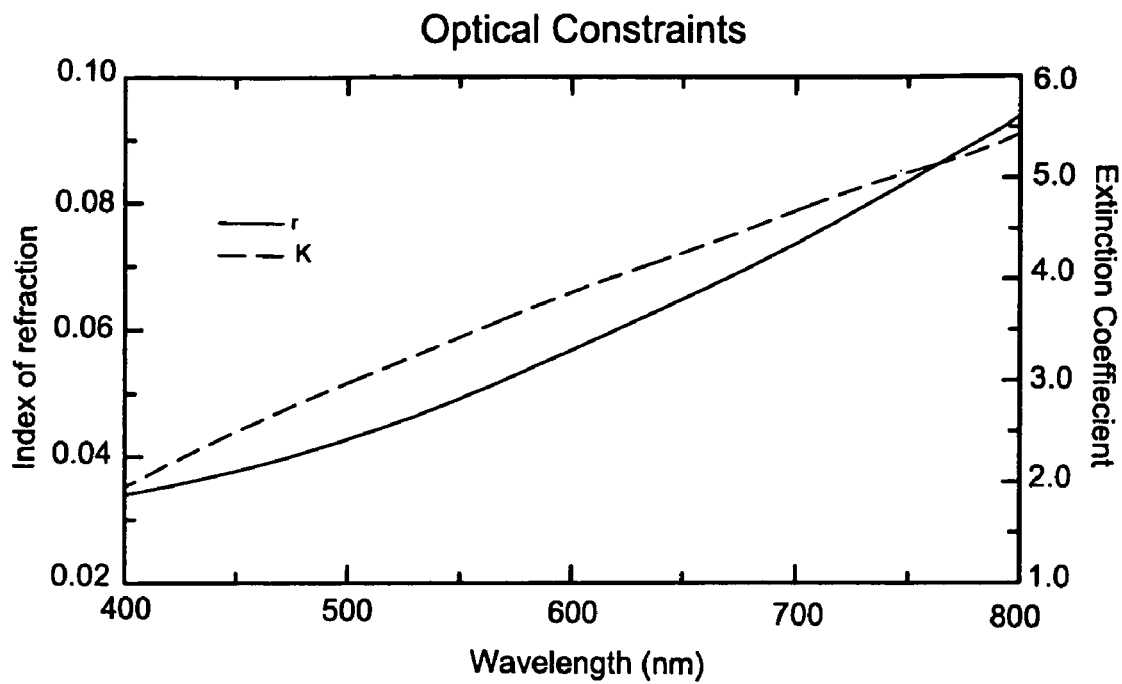
FIG. 5 illustrates the optical constants over the wavelength range of 400 nm to 800 nm of one embodiment of a particular silver alloy.
Figure 6:
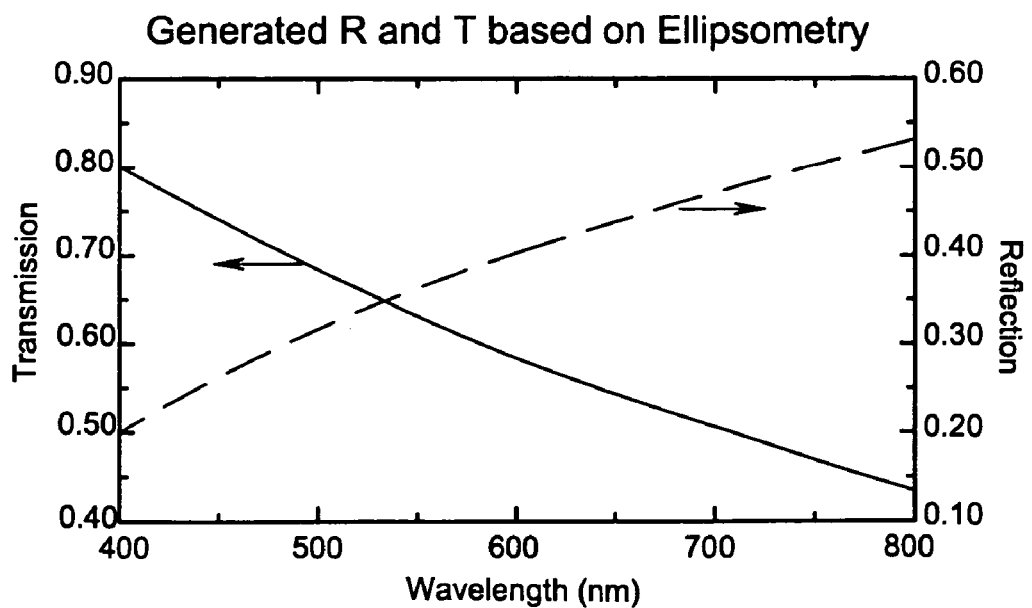
FIG. 6 illustrates the generated percent reflection and percent transmission of the same silver alloy used to generate the data shown in FIG. 5, this data was collected over the wavelength range of 400 to 800 nm, using a layer with a thickness of about 10 nm.

In FIG. 5, the optical constants of a typical silver alloy of this invention from 400 nm to 800 nm wavelength is presented. The solid line is the index of refraction n, the real part of the constant and the dotted line is the extinction coefficient k, the imaginary part of the optical constant. The composition of this alloy in atomic percent is Pd: 1.2%, Pt: 0.5%, Cu: 0.3%, Au: 1.0%, with balance Ag. The % reflectivity in dotted line and % transmission in solid line from 400 to 800 nm wavelength of this alloy thin film at 10 nm thickness is presented in FIG. 6. As a stand-alone film, it has reflectivity of about 43% and transmission of about 54% at 650 nm wavelength which is well suited for the semi-reflective layer for the dual layer optical disc such as DVD-9 as indicated in FIG. 3. At a thickness of 60 to 80 nm, it has reflectivity of approximately 98% at 650 nm wavelength it is well suited for the high reflectivity layer of DVD-9 as indicated in FIG. 3. In a preferred method of applying this silver alloy thin film in the production of DVD-9, both the semi-reflective layer and the high reflectivity layer of the same composition can be applied by the same magnetron sputtering machine using a single sputtering target material. Thus compared to the prior art of using two sputtering machines, one using the gold as semi-reflective layer and one using an aluminum alloy as the high reflectivity layer, one sputtering machine can be eliminated with considerable cost saving. Since the silver alloy has considerable higher reflectivity as the high reflectivity material in a dual layer DVD as compared to the aluminum alloy, the resultant balanced reflectivity for both layers using silver alloy is considerably higher than a gold and aluminum dual layer combination. This enhances the quality of the playback signal. Thus a low cost, high quality dual layer DVD using silver alloys for both layers can be produced. It is also understood that the silver alloy of the present invention can be used as a semi-reflective layer only, while the highly reflective layer includes conventional aluminum alloys.

With the recent commercial availability of diode laser based on GaN emitting at 400 nm wavelength, the optical disc's storage capacity can be further increased over the DVD using the shorter wavelength laser. It is further understood that the silver alloy with the optical constants presented in FIG. 5 can be used at 400 nm wavelength in a dual-layer optical disc construction as in FIG. 3 or in a tri-layer optical disc construction as depicted in FIG. 4.

It is further understood that a multi-layer optical disc using the same silver and copper alloys of the present invention for some or all of the semi-reflective layers and reflective layer is technically very feasible.

Figure 9:
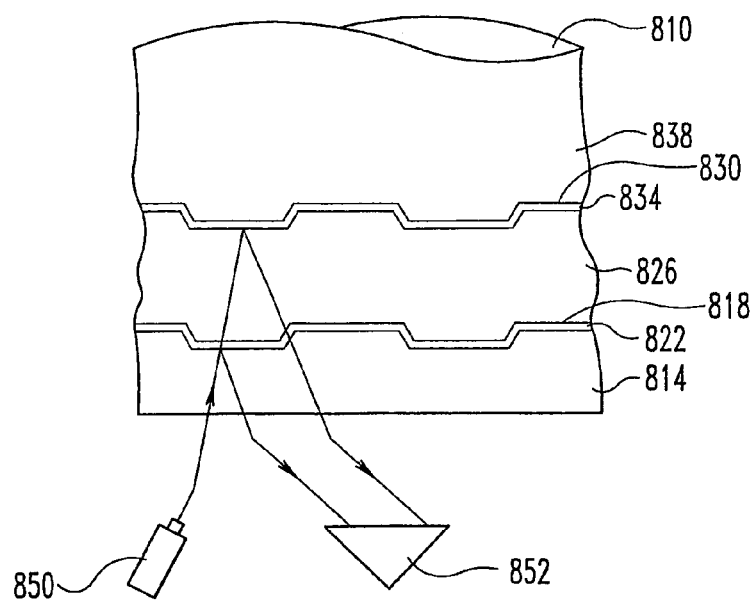
FIG. 9 illustrates another embodiment, an optical storage system of the Blu-ray type having layers suitable for high density digital information storage readable from one side.

Another embodiment that can make use of the silver and copper alloys is shown in FIG. 9. One embodiment is an optical storage medium 810, which can include a medium frequently referred to as a "Blu-Ray" disc. Optical storage medium 810 comprises a substrate or layer 838, a highly reflective layer or coating 834 on a data pit pattern 830, a spacer layer 826, a semi-reflective layer or coating 822 on a data pit pattern 818, and a transparent cover layer 814. Though not depicted exactly to scale, substrate 838 is typically about 1.1 mm thick and the remaining layers total about another 0.1 mm in thickness.

As illustrated in FIG. 9, optical storage medium 810 has at least two sets of information pits and lands, items 818 and 830, that are readable from the same side of the device. An optical laser 850 emits an optical beam toward medium 810. At least a portion of the optical beam may be reflected by either layers 822 or 834 (depending upon which layer the laser is focused). Light reflected from either layer 822 or 834 is sensed by detector 852, which senses modulations in light intensity based on the presence or absence of a pit in a particular spot on the highly reflective layer or the semi-reflective layer. As previously discussed in conjunction with similar embodiments, each of these data patterns are molded or stamped respectively into spacer layer 826 and substrate 838. What makes the Blu-ray version slightly different, however, is that the pits and lands are sized to be read by a laser having a wavelength of about 405 nm and a lens numerical aperture of about 0.85.

Figure 10:
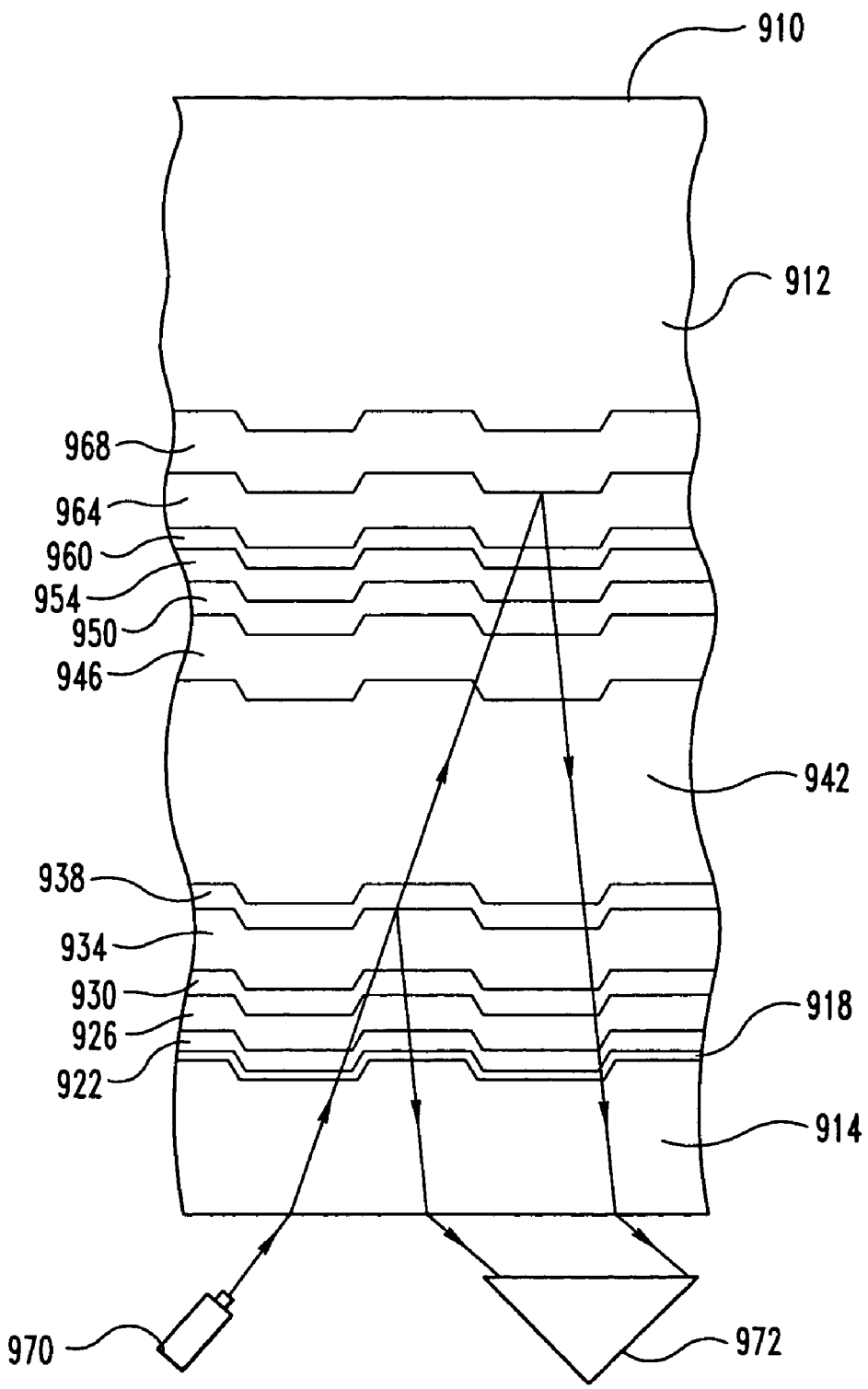
FIG. 10 illustrates another embodiment, an optical storage system of the Blu-ray type including having two re-writable high density digital information storage layers readable and re-recordable from one side.

Still another embodiment is illustrated in FIG. 10, an optical storage device 910 of the Blu-ray rewritable type. Optical storage device 910 comprises two read and rewritable layers 926, 954. Optical storage device 910 comprises a substrate layer 912 about 1.1 mm thick, adjacent to highly reflective layer or coating 968. Adjacent to layer or coating 968 is a first dielectric layer 964 comprising ZnS—SiO$_2$, adjacent to layer 964 is a first interface layer 960 such as GeN or others. Adjacent to layer 960 is a phase-change type recording layer 954 such as Ge—Sb—Te and the like with thickness about 10 to 15 nm, adjacent to layer 954 is layer 950 a second layer such as Ge—N and the like. Adjacent to layer 950 is another dielectric layer 946 of ZnS—SiO$_2$.

Optical storage device 910 further includes an intermediate layer 942 sandwiched between the dielectric layer 946 approximately 20 to 40 microns thick and a semi-reflective layer or coating 938 about 10 nm thick. A third dielectric layer 934 comprised of ZnS—SiO$_2$ is adjacent to layer or coating 938. Adjacent to layer 934 is a third Interface layer 930 made with GeN or others, a recording layer 926 6–10 nm thick comprised of Ge—Sn—Sb—Te or other phase-change material is sandwiched between layers 930 and a forth interface layer 922 made of GeN and the like. Adjacent to layer 922 is a forth layer of dielectric material layer 918 comprised of ZnS—SiO$_2$. Adjacent to layer 918 is a transparent cover layer 914 about 80 to 100 microns thick.

As illustrated in FIG. 10 an optical beam emitted by laser 970 passes through layers 914, 918, 922, 926, 930, 934 and is reflected by semi-reflective layer 938 and sensed by detector 972. A portion of an optical beam emitted by laser 970 passes through layers 914, 918, 922, 926, 930, 934, 938, 942, 946, 950, 954, 960, 964, and is reflected by reflective layer 968 to and sensed by detector 972. All of the silver alloy compositions disclosed in this invention can be used for in the manufacture of semi-reflective layer 938 or the highly reflective layer 968.

Still referring to FIG. 10 in the recording mode, the laser beam from laser 970 will be focused on the phase-change layer 926 or 954 to change its reflectivity properties. This is similar to a conventional CD-RW, DVD-RW, DVD+RW or next generation of optical discs with playback laser wavelength at around 400 nm as disclosed in prior art such as U.S. Pat. Nos. 6,544,616, 6,652,948, 6,649,241 and others, these references are herein incorporated by reference in their entirety.

Figure 11:
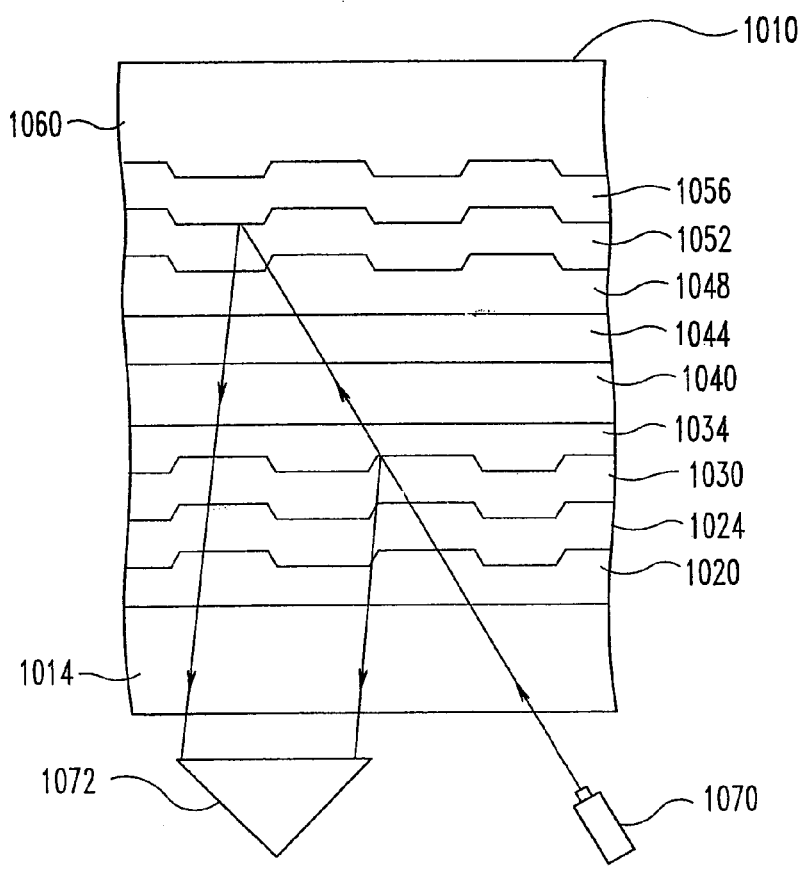
FIG. 11 illustrates an another embodiment, an optical storage system of the Advanced Optical Disc (AOD) type including two high density digital information storage layers readable from one side.

Yet another embodiment is illustrated in FIG. 11. FIG. 11 illustrates an optical storage device 1010 of the 'Advanced Optical Device (AOD)' configuration further comprising two read, and write once layers 1044, 1020. Optical storage device 1010 is a dual-layer write once recording medium comprised of 1.1 mm thick substrate layer 1060, adjacent to a highly reflective layer 1056 about 30 to 60 nm thick usually made with silver alloy of the current invention or an aluminum alloy. Layer 1056 is adjacent to protective layer 1052, layer 1052 is adjacent to a recordable layer 1048, 15 to 25 nm thick comprised of Te—O—Pd based material. Layer 1048 is adjacent to protective film layer 1044.

Layer 1044 is adjacent to a separation layer or spacer layer 1040 which is adjacent to a 10 nm thick semi-reflective layer or coating 1034 made with silver alloy of the current invention. Layer or coating 1034 is adjacent to protective film layer 1030 which is adjacent to a second 10 nm thick recording layer 1024 comprising Te—O—Pd based material. Layer 1024 is adjacent to protective film 1020, which is adjacent to a 0.075 mm thick cover layer 1014.

As illustrated in FIG. 11, an optical beam emitted by laser 1070 passes a lens system with NA 0.85 (not shown in FIG. 11 through layers 1014, 1020, 1024, 1030 and is reflected by the semi-reflective layer 1034 and sensed by detector 1072. A portion of an optical beam emitted by laser 1070 passes through layers 1014, 1020, 1024, 1030, 1034, 1040, 1044, 1048, 1052, and is reflected by highly reflective layer 1056 and sensed by detector 1072. Detector 1072 senses modulations in light intensity based on the amorphous or the crystalline state of the layer 1024 or 1048 in a particular spot on semi-reflective layer or coating 1034 and on the highly reflective layer 1056 and reads the stored information back by focusing laser light from 1070 laser on the write-once layer 1024 or 1048. The spacer layer 1040 should be thick enough so that when the read beam is focused on the recordable layer 1024, the read beam is sufficiently defocused on the next recordable layer 1048 and only the modulation of light information from 1024 is reflected back to the detector 1072. Conversely, when the read beam is focused on the recordable layer 1048, the read beam is sufficiently defocused on the other recording layer 1024 and only the modulation from 1048 is reflected to the detector 1072 and read.

It is also understood that as described in FIGS. 10 and 11, a dual layer disc of the rewritable or a write-once type with a phase change recording layer or other types of recording layers can be constructed that at least two recording layers can be recorded and read from one side or the same side of the disc wherein a semi-reflective layer made with silver alloy of the current invention can be utilized and made useful.

It is understood that the disc structure as described in FIG. 11 can be modified that both 1014 and 1060 can be of approximately of the same thickness or around 0.6 mm and with similar phase-change material recording stack, the disc structure could be a rewritable optical disc of the "Advanced Optical Disc" or AOD type wherein the recording and playback laser wavelength is around 400 nm.

Figure 12:
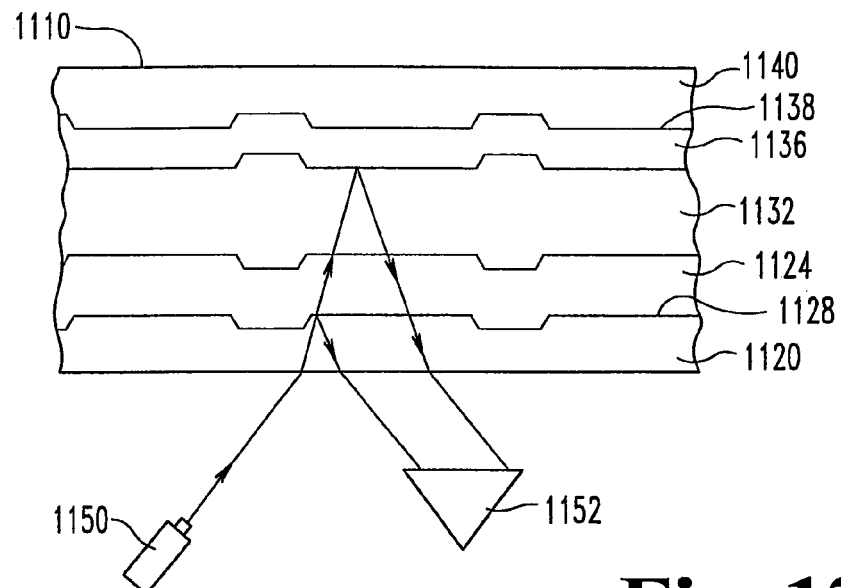
FIG. 12 illustrates an another embodiment, an optical storage system of the Advanced Optical Disc (AOD) type including two re-writable high density digital information storage layers readable and re-recordable from one side.

It is further understood that all the optical disc structures as described in FIGS. 9, 12 contain a dual layer HD-DVD disc structure wherein the playback laser has a wavelength around 400 nm or any other optical disc structure with two or more layers of information all recorded or played back from one side of the disc in which a semi-reflective layer or layers of silver alloy as disclosed in this invention.

Another embodiment is illustrated in FIG. 12 is optical storage device 1110 of a prerecorded type is the proposed next generation optical storage device sometimes referred to as an Advanced Optical Device (AOD). AOD is a system that uses a 405 nm optical beam and a lens system with a NA of 0.65 to store and retrieve information for both faces of an optical storage device wherein the transparent substrates 1120 and 1140 made typically with injection molded polycarbonate are approximately 0.6 mm thick.

Device 1110 comprises a transparent substrate layer 1140 adjacent to a highly-reflective layer or coating 1136 which is adjacent to and conforms to the contours of a first data pit pattern 1138 comprising a set of pits and lands. High reflectivity layer 1136 is adjacent to spacer layer 1132 which is adjacent to a semi-reflective layer or coating 1124 of the current invention which is adjacent to and conforms to the contours of a second data pit pattern 1128 comprising a series of pits and lands. Layer 1124 is adjacent to a second substrate or layer 1120.

As illustrated in FIG. 12, a portion of an optical beam emitted by laser 1150 passes through layers 1120, 1124, 1128, 1132, and is reflected by the highly reflective layer 1136 and sensed by detector 1152. A portion of an optical beam emitted by laser 1150 passes through layers 1120, and is reflected by semi-reflective layer or coating 1124 and sensed by detector 1152. Detector 1152 senses modulations in light intensity based on the presence or absence of a pit or land in a particular spot on semi-reflective layer or coating 1124 and the highly reflective layer or coating 1136 by focusing on layer 1124 or 1136.

Figure 13:
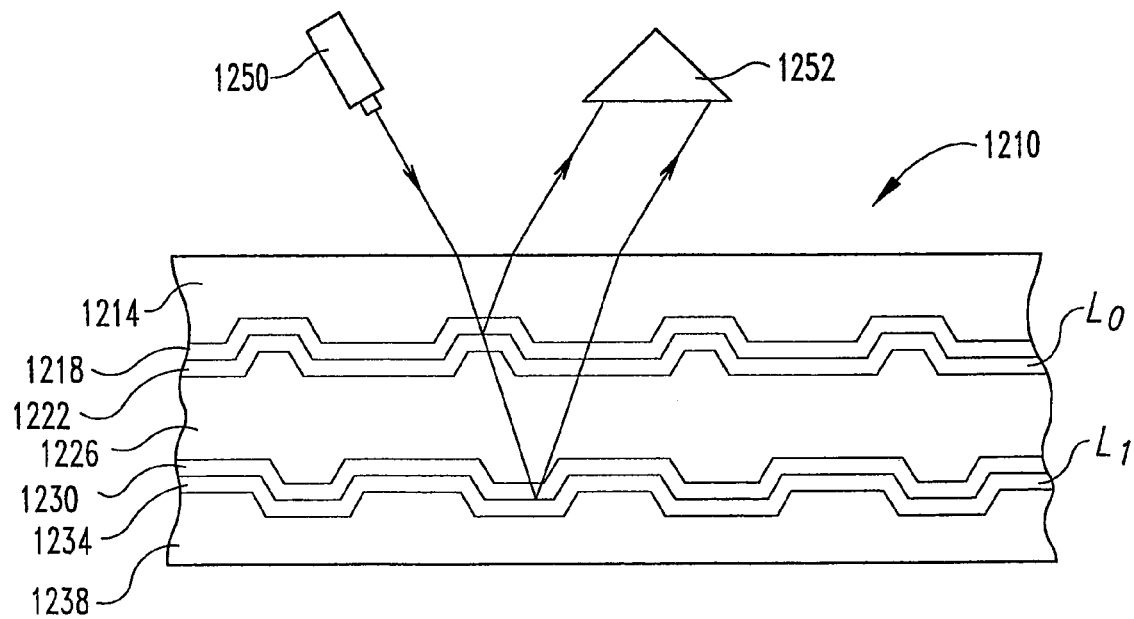
FIG. 13 illustrates still another embodiment, an optical storage system including two readable and recordable layers readable and recordable from one side.

In another embodiment, illustrated in FIG. 13 an optical storage device 1210 of the organic dye recordable-dual-layer type comprises two layers which are both readable and recordable from the same side of the device. Device 1210 comprises substrate layer 1214 adjacent to first recordable dye layer 1218. Dye layer 1218 is adjacent to semi-reflective layer or coating 1222. Layer or coating 1222 is adjacent to spacer layer 1226. Spacer layer 1226 is adjacent to a second dye recording layer 1230. Layer 1230 is adjacent to highly reflective layer or coating 1234. Reflective layer or coating 1234 is adjacent to polycarbonate substrate or layer 1238.

In write mode, as illustrated in FIG. 13, optical beam source 1250 emits an optical beam which passes through layers 1214, and is focused on dye layer 1218. When laser 1250 is operating at high intensity the optical beam focused on layer 1218 decomposes the dye in layer 1218 creating a data pit pattern comprising the equivalent of a series of pits and lands. A portion of an optical beam emitted by laser 1250 passes through layers 1214, 1218, 1222, 1226 and is focused on dye layer 1230. When laser 1250 is operating at high intensity the optical beam focused on layer 1230 decomposes the dye in layer 1230 to create a data pit pattern comprising a series of pits and lands.

In read mode a portion of an optical beam emitted by laser 1250 passes through transparent polycarbonate layer 1214 and dye layer 1218, is reflected by semi-reflective layer or coating 1222 is sensed by detector 1252. A portion of the optical beam also passes through layers 1214, 1218, 1222, 1226, 1230 and is reflected by highly reflective layer 1234 and sensed by detector 1252. Detector 1252 senses modulations in light intensity based on the presence or absence of a pit or land in a particular spot on the highly reflective layer or coating 1234 or by the semi-reflective layer or coating 1222 depending on whether the laser light 1250 is focused on the semi-reflective layer 1222 or the highly reflective layer 1234. For the general operation of an organic dye-based optical recording medium, the reader can refer to U.S. Pat. Nos. 6,641,889, 6,551,682, etc.

It is further understood that the optical disc structure as described in FIG. 13 can be a dual layer DVD-R disc wherein the playback laser beam has a wavelength of around 635 to 650 nm, or the structure can be a dual layer HD-DVD-R disc wherein the playback laser has a wavelength around 400 nm or any other optical disc structure wherein two or more layers of information can all be recorder or played back from one side of the disc in which a semi-reflective layer or layers of silver alloy as disclosed in this invention is made useful.

Figure 14:
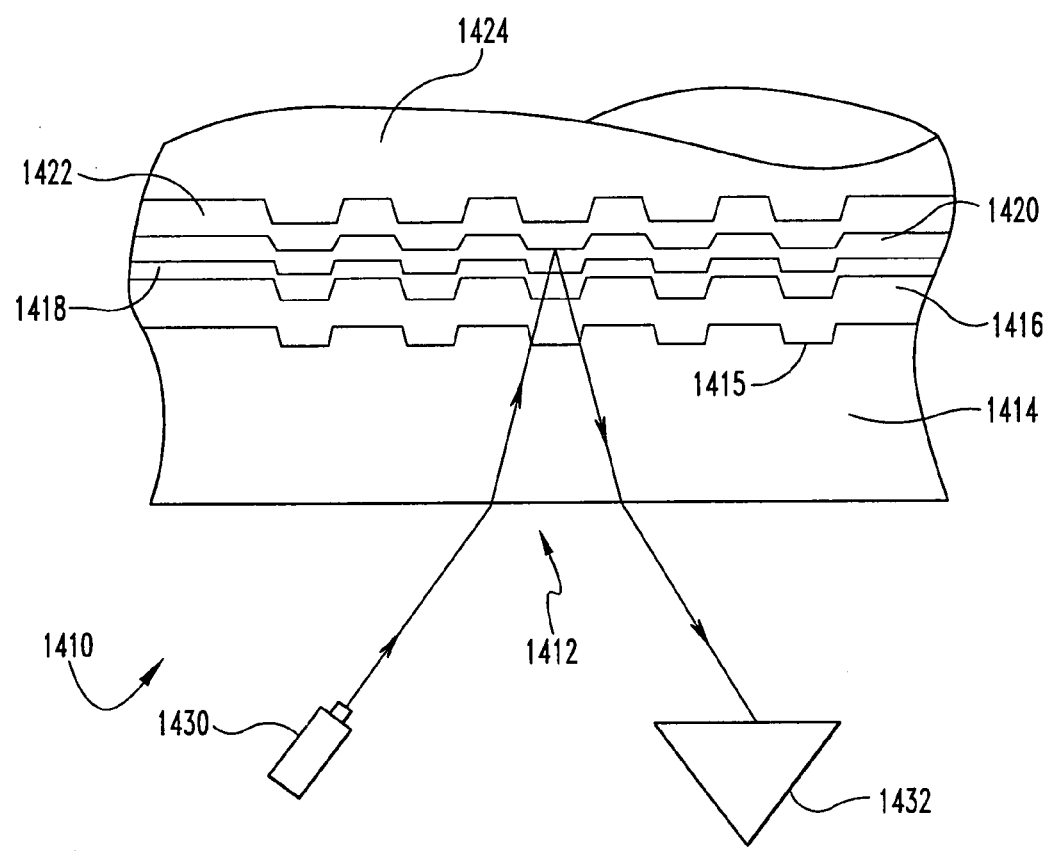
FIG. 14 illustrates yet another embodiment, an optical storage device including a rewritable information layer.

Still another embodiment is illustrated in FIG. 14, optical data storage system 1410. Optical storage medium 1412 comprises a transparent substrate or a transparent layer 1414, a dielectric layer 1416 on a first data pit pattern 1415, a recording layer 1418 made of a material having a microstructure including domains or portions capable of repeatedly undergoing laser-induced transitions from a first state to a second state and back again (i.e., an optically re-recordable or rewritable layer), such as a phase change material or a magneto-optic material, another dielectric material 1420, a highly reflective thin film layer 1422, and a transparent substrate or layer 1424. As used in this specification, a dielectric material is a material that is an electrical insulator or in which an electric field can be sustained with a minimum dissipation of power. The different layers 1414, 1416, 1418, 1420, and 1422 of the optical storage medium 1410 are preferably oriented so as to be adjacent with one another.

The optical recordable material may be for example, a magneto-optic material selected from the group consisting of Tb—Fe—Co and Gd—Tb—Fe.

Commonly used phase change materials for the recording layer 1418 include germanium-antimony-tellurium (Ge—Sb—Te), silver-indium-antimony-tellurium (Ag—In—Sb—Te), chromium-germanium-antimony-tellurium (Cr—Ge—Sb—Te) and the like. Commonly used materials for the dielectric Layer 1416 or 1420 include zinc sulfide-silica compound (ZnS.SiO$_2$), silicon nitride (SiN), aluminum nitride (AlN) and the like. Commonly used magneto-optic materials for the recording layer 1418 include terbium-iron-cobalt (Tb—Fe—Co) or gadolinium-terbium-iron (Gd—Tb—Fe). An optical laser 1430 emits an optical beam toward medium 1412, as shown in FIG. 14. In the recording mode for the phase change recordable optical medium, light from the optical beam is modulated or turned on and off according to the input digital data and focused on the recording layer 1418 with suitable objective while the medium is rotated in a suitable speed to effect microstructural or phase change in the recording layer. In the playback mode, the light from the optical beam that is reflected by the thin film layer 1422 through the medium 1412 is sensed by the detector 1432, which senses modulations in light intensity based on the crystalline or amorphous state of a particular spot in the recording layers. The disc is unique in that one of the alloys presented below is deposited upon the medium and used as the highly reflective thin film 1422. In another alternative (not shown), the disc may be varied by attaching two optical storage media 1412 back-to-back, that is, with each transparent substrate or coating 1414 facing outward. The attachment method could be by UV cured adhesive, hot melt adhesive or other type of adhesives.

As illustrated in FIG. 14, if transparent substrate 1414 is about 1.2 mm thick made of injection molded polycarbonate with continuous spirals of grooves and lands, 1424 is a UV cured acrylic resin 3 to 15 micron thick acting as a protective layer with the playback laser 1430 at 780 to 820 nanometer, and rewritable layer 1418 is a phase change material of a typical composition such as Ag—In—Sb—Te, it is a compact disc-rewritable disc structure, commonly known as a CD-RW. To record and read information, phase change discs utilize the recording layer's ability to change from an amorphous phase with low reflectivity (dark) to a crystalline phase with high reflectivity (bright). Before recording, the phase change layer is in a crystalline state. During recording, a laser beam with high power focused on the recording layer will heat the phase change material to high temperature and when the laser is turned off, the heated spot will cool off very quickly to create an amorphous state. Thus a series of dark spots of amorphous states are created according to the input data of turning the focused laser beam on and off. These on and off correspond to "1" and "0" of a digital data stream.

In reading, a low laser power is used to focus on and read the dark or bright spots along the track of the disc to play back the recorded information. To erase, an intermediate laser power is used to focus on the grooves or tracks with the disc spinning so that an intermediate temperature of the focused spots is reached. After the laser is moved to another location, the spots cool to room temperature forming a crystalline structure of high reflectivity. This returns the recording layer to its original or erased state. The change of the spots' state from amorphous to crystalline is very reversible, thus many record and erase cycles can be accomplished and different data can be repeatedly recorded and read back without difficulty.

If transparent substrate 1414 is about 0.5 to 0.6 mm thick made of injection molded polycarbonate with continuous spirals of grooves and lands, 1416 and 1420 are dielectric layers typically made of ZnS.SiO$_2$, 1418 is made of a phase change material such as Ag—In—Sb—Te or Ge—Sb—Te, 1422 is made of a silver alloy of the current invention, and 1424 is a UV cured resin bonding another half of the same structure as depicted in FIG. 14., and the structure is used with a read and write laser 1430 at 630 to 650 nanometer wavelength, then it is a digital versatile disc with rewritable capability, commonly referred to as DVD+RW. Some preferred phase-changeable materials include materials from the following series: As—Te—Ge, As—In—Sb—Te, Te—Ge—Sn, Te—Ge—Sn—O, Bi—Ge, Bi—Ge—Sb, Bi—Ge—Te, Te—Se, Sn—Te—Se, Te—Ge—Sn—Au, Ge—Sb—Te, Sb—Te—Se, In—Se—Tl, In—Sb, In—Sb—Se, In—Se—Tl—Co, Cr—Ge—Sb—Te and Si—Te—Sn, where As is arsenic, Bi is Bismuth, Te is tellurium, Ge is germanium, Sn is tin, O is oxygen, Se is selenium, Au is gold, Sb is antimony, In is indium, Tl is thallium, Co is cobalt, and Cr is chromium. In this disc configuration, the highly reflective layer 1422 needs not only high reflectivity at 650 nanometer wavelength and high thermal conductivity, but also high corrosion resistance in the presence of ZnS.SiO$_2$. Conventional aluminum alloy does not have high enough reflectivity nor high enough thermal conductivity.

Pure silver or other conventional silver alloys do not have either high corrosion resistance or high reflectivity and high thermal conductivity. Thus it is another objective of the current invention to provide a series of silver alloys that can meet the requirements for this application.

Figure 15:
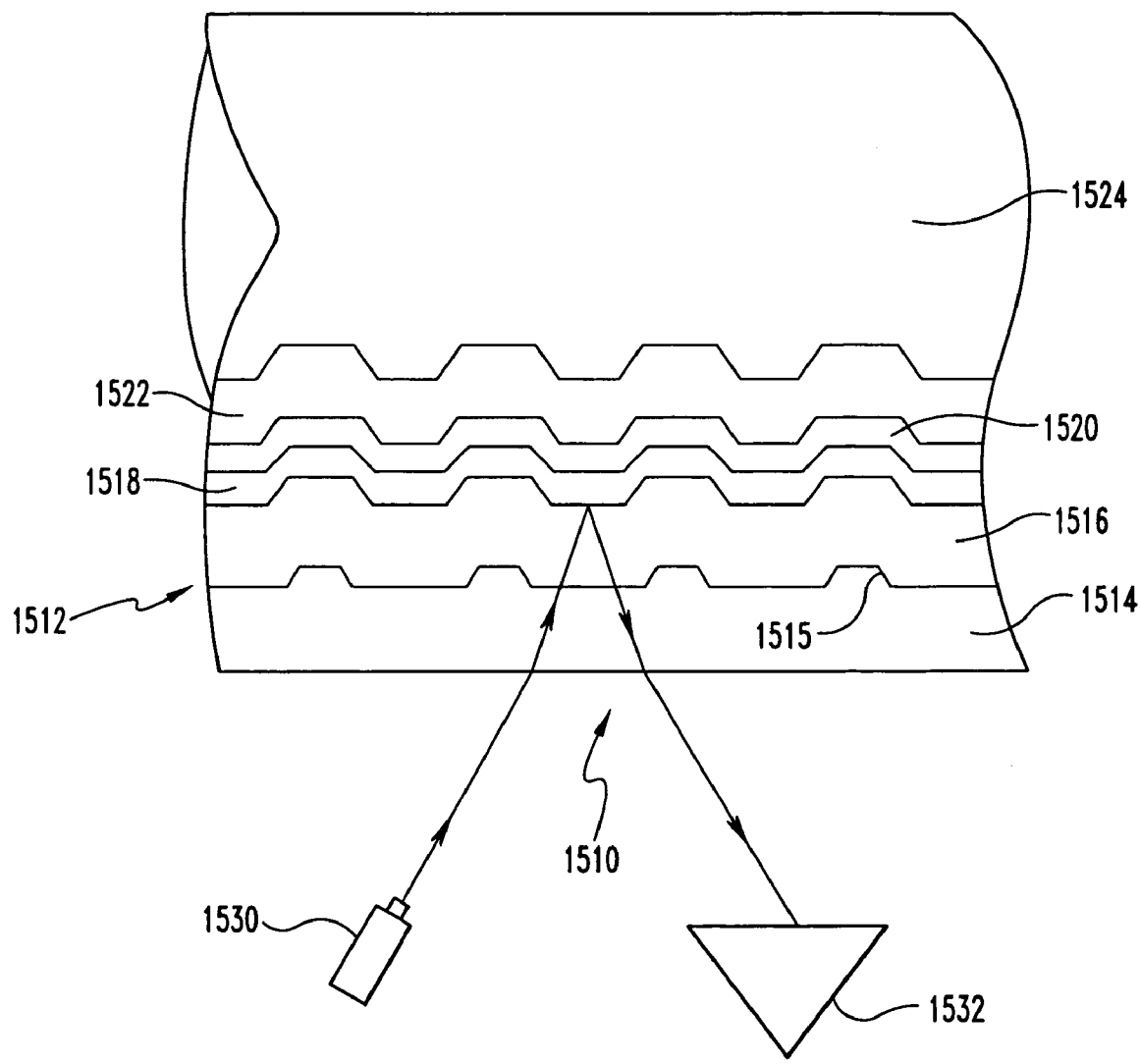
FIG. 15 illustrates another embodiment, an optical storage device including a rewritable information layer.

Another embodiment is shown in FIG. 15, a rewritable type optical information storage system 1510. Transparent cover layer 1514 is approximately 0.1 mm thick. Dielectric layers 1516 and 1520 are preferably made of $ZnS.SiO_2$ and serve as a protective layer for the rewritable layer or phase change layer 1518. Rewritable layer 1518 is preferably formed from Ag—In—Sb—Te or the like. Highly reflective layer 1522 is preferably formed from a silver alloy, such as disclosed herein. Transparent substrate 1524 is preferably approximately 1.1 mm in thickness with continuous spiral tracks of grooves and lands usually made with polycarbonate resin. Laser 1530 preferably has a wavelength of about 400 nm with associated optics to focus the laser beam onto recording layer 1518. The reflected laser beam is received by the detector 1532, which preferably includes associated data processing capability to read back the recorded information. System 1510 is sometimes called a "Digital Video Recording System" or DVR, and it is designed to record high definition TV signals. The principle of operation of optical information storage system 1510 is similar to that of a CD-RW disc except that the recording density is considerably higher, the storage capacity of a 15-inch diameter disc is approximately 20 gigabytes. Again the performance of the disc stack depends on a layer 1522, that is highly reflective at 400 nm wavelength, with high corrosion resistance and very high thermal conductivity. Conventional reflective layers such as aluminum, gold or copper all have difficulty meeting these requirements. Thus it is another objective of the current invention to provide a silver alloy reflective layer that is capable of meeting these demanding requirements.

Other embodiments include, for example, optical storage devices readable and in some embodiments also rewritable from both sides of the device.

Figure 16:
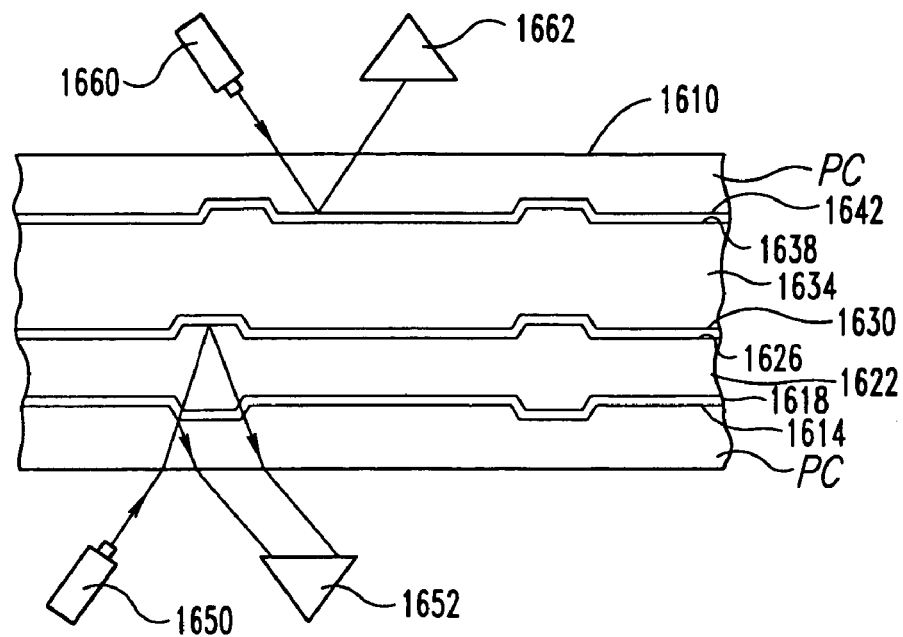
FIG. 16 illustrates still another embodiment, a DVD-14.

One such embodiment is illustrated in FIG. 16 optical data storage system 1610. Optical storage system 1610 is sometimes referred to as DVD-14 and is illustrative of devices that have the capacity to store accessible data on both sides of the structure.

Optical storage system 1610 comprises a 0.6 mm thick transparent polycarbonate substrate (PC), adjacent to the PC layer or a part of the PC layer is a first data pit pattern 1614 comprising a series of pits and lands. Adjacent to layer 1614 and conforming to the contour of layer 1614 is a semi-reflective layer or coating 1618. Adjacent to the layer or coating 1618 is a spacer 1622 comprised of a transparent material adjacent to or a part of spacer layer 1622 is a second data pit pattern 1626 comprising a series of pits and lands. Adjacent to and conforming to the contour of second data pit pattern 1626 is a reflective layer or coating 1630. Both semi-reflective layer or coating 1618 and highly reflective layers 1630 can be read from the same side of structure 1610.

Adjacent to layer or coating 1634 is a third reflective layer or coating 1638. Layer or coating 1638 is adjacent to and conforms to the contours of a third data pit pattern 1642 comprising a series of pits and lands. Third data pit pattern 1642 and highly reflective layer or coating 1638 are readable from the side of the device opposite to the side of the device from which data pit patterns 1618, 1626 are read. Adjacent to or comprising data pit pattern 1642 is a second 0.6 mm thick polycarbonate layer.

An optical laser 1660 emits an optical beam towards second polycarbonate layer PC, the beam is reflected by highly reflective layer or coating 1638 and sensed by detector 1662 modulations in light intensity based on the presence or absence of a pit in a particular spot on the highly reflective coating or layer.

As illustrated in FIG. 16, from the side of device 1610 opposite of laser 1660, a second optical beam from laser 1650 is directed towards first polycarbonate substrate layer PC towards data pit pattern 1614. As illustrated in FIG. 16, the second laser 1650 emits an optical beam towards semi-reflective layer or coating 1618 and highly reflective layer 1630. At least a portion of the optical beam emitted by laser 1650 passes through semi-reflective layer 1618 to reach reflective layer 1626. Light from the optical beam that is reflected by layer or coating 1626 is sensed by detector 1652, which senses modulations in light intensity based on the presence or absence of a pit or land in a particular spot on the highly reflective layer.

While the optical storage device illustrated in FIG. 16 comprises multiple laser sources 1650, 1660 and multiple detectors 1652, 1662, the same could be accomplished using a single laser source and detector configured such that the same optical beam source and detector can be used to collect signal from all sets of information pits and lands comprising the device, for example set 1618, 1626, 1642.

Figure 17:
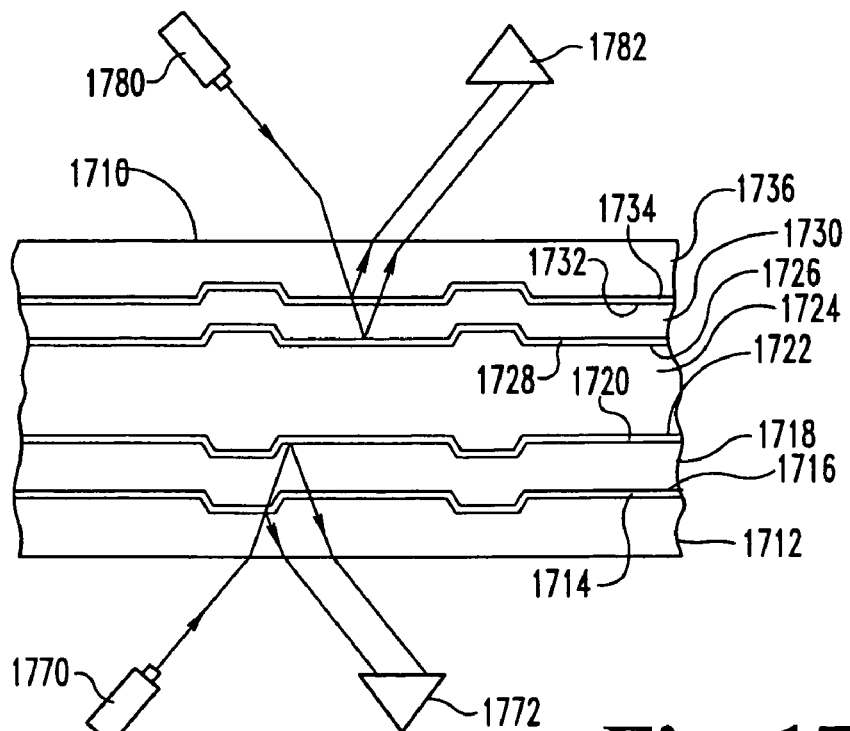
FIG. 17 illustrates yet another embodiment, a DVD-18.

In still another embodiment the invention may be practiced using the optical storage system 1710 as illustrated in FIG. 17. Optical storage medium 1710 is illustrative of a DVD-18 and is representative of optical storage systems that have multiple information layers readable from both sides of the optical storage medium.

Optical storage system 1710 comprises a 0.6 mm thick transparent substrate 1712 adjacent to, or comprising a first data pit pattern 1714. Data pit pattern 1714 comprises a series of pits and lands and is adjacent to a semi-reflective layer or coating 1716. The device further includes a transparent spacer layer 1718 about 50 microns thick, and a second data pit pattern 1720 adjacent to a highly reflective film or coating 1722. Both semi-reflective layer or coating 1716 and highly reflective layer or coating 1722 can be read from the same side of 1710.

An optical laser 1770 emits an optical beam towards transparent layer 1712. As illustrated in FIG. 17 at least a portion of the optical beam emitted by laser source 1770 passes through semi-reflective layer 1716 to reach highly reflective layer 1722. Light from the optical beam that is reflected by semi-reflective layer or coating 1716 and highly reflective layer 1722 is sensed by detector 1772, which senses modulations in light intensity based on the presence or absence of a pit or land in a particular spot on the highly reflective layer or the semi-reflective layer.

The optical storage device illustrated in FIG. 17 further includes the spacer layer 1724, which connects the portion of the device comprising the first two information layers 1714, 1720 with the portion of the device comprising the third and fourth information layers 1728, 1734. Substrate layer 1724 is adjacent to and separates highly reflective layer or coating 1728 and highly reflective layer or coating 1722.

Highly reflective layer or coating 1724 is adjacent to, and conforms to the contours of the pit and lands or data pit pattern layer 1728. Layer 1728 is adjacent to spacer layer 1726, spacer layer 1726 is adjacent to semi-reflective layer 1732, which is adjacent to, and conforms to the contours of data pit pattern layer 1734. Data pit pattern layer 1734 is contiguous with, or adjacent to, 0.6 mm thick substrate layer 1736.

In the embodiment illustrated in FIG. 17 an optional second optical laser 1780 is provided which emits an optical beam towards layer 1736. A portion of the light emitted by laser 1780 passes through semi-reflective layer or coating 1732 and is reflected by highly reflective layer or coating 1728. Light reflected by semi-reflective layer or coating 1732 and highly reflective layer 1728 is sensed by detector 1782, which senses modulations in light intensity based on the presence or absence of a pit or land in a particular spot on the highly reflective layer.

While the optical storage device illustrated in FIG. 17 includes multiple laser sources 1770, 1780 and multiple detectors 1772, 1782, the same could be accomplished using a single laser source and detector configured such that the same optical beam source and detector can be used to collect signal from all sets of information pits and lands comprising the device.

It should be understood that various silver and copper based alloys described in the embodiments and in combinations of the embodiments can be used in both currently commercialized devices and in future generations of optical discs. These devices include optical data storage devices that use a reading laser operating at wavelengths shorter than 650 nanometers.

It should also be understood, that various silver and copper alloys described in various embodiments and combinations of embodiments of can be uses as semi-reflective film layers in a wide variety of optical data storage devices. These devices include DVDs that have multiple surfaces comprising information or the capacity to store information.

EXAMPLES

Example 1

An alloy composition of silver with approximately 8 to 10 atomic percent palladium will have a reflectivity of approximately 89 to 91 percent at the wavelength of 800 nanometers and a reflectivity of approximately 83 to 85 percent at the wavelength of 650 nanometers and a reflectivity of approximately 78 to 80 percent at the wavelength of 500 nanometers with the film thickness at about 50 to 100 nanometers.

Example 2

A silver-rich alloy with 9.0 to 9.5 a/o percent of gold will have a reflectivity of approximately 94 to 95 percent at 650 nanometers wavelength. If a reflectivity higher than gold is desired, the gold concentration in silver can be reduced continuously to the pure silver side of the binary phase diagram without incurring any fabrication difficulty of the source material for sputtering or for thermal evaporation.

If the thickness of the thin film is reduced to the 10 to 20 nanometers range, the reflectivity will be reduced to 18 to 30 percent range applicable for DVD-9's semi-reflective layer. Adding a low concentration of an oxide former such as cadmium can further enhance the corrosion resistance of the alloy. As silver has a tendency to dissolve small amount of oxygen in the solid state which tends to lower the reflectivity of the alloy. The added cadmium will react with the oxygen to form cadmium oxide and lessen the degree of oxygen's impact to reflectivity. The desirable range of cadmium is in the approximate range of 0.01 percent to 5.0 atomic percent, with the preferred range from about 0.1 to 1.0 a/o percent.

Example 3

A silver based alloy with about 5 a/o percent of gold and about 5 a/o percent of palladium will have a reflectivity of approximately 86 to 93 percent at the wavelength of about 650 nanometers.

Example 4

A silver based alloy sputtering target with the composition of about 8.9 a/o percent gold, 3.8 a/o percent palladium and balance silver was used to make CD-R discs with the following procedure: On top of a transparent polycarbonate substrate of 1.2 millimeters thickness and 12 centimeters in diameter with pregrooves injection molded from a stamper, a liquid phthalocyanine based recording dye was spin-coated and dried. Subsequently, a highly reflective thin film of silver based alloy approximately 60 nanometers in thickness was deposited on top of the recording dye using a sputtering target of the above mentioned composition in a magnetron sputtering machine. Afterwards, a liquid organic resin was spin-coated on the silver based alloy thin film and cured by ultraviolet light. The reflectivity of the CD-R disc at 780 nanometers wavelength was measured and found to be very similar to discs using pure gold as the high reflectivity layer at similar thickness. The electronic signals and the block error rate of the disc were measured and found to be acceptable and within the CD-R's specification. An accelerated aging test was conducted by subjecting the discs to 80 degrees C. and 85 percent relative humidity for 21 days subsequently. After the aging test, the electronic signals and the block error rate of the discs were measured again and no significant degradation was observed due to the aging test.

Example 5

Another silver based alloy sputtering target with the composition of about 8.7 a/o percent gold, 8.5 a/o percent palladium and balance silver was employed to produce the semi-reflective layer of the DVD-9 dual layer disc with the following procedure: On top of a transparent polycarbonate half disc of approximately 0.6 millimeter thickness and 12 centimeters in diameter with information pits injection molded from a suitable stamper, a semi-reflective thin film called layer "zero" of silver based alloy approximately 11–12 nanometers in thickness was deposited using the sputtering target of the above mentioned composition in a magnetron sputtering machine. On top of another transparent polycarbonate half disc of approximately 0.6 millimeter thickness with information pits injection molded from another suitable stamper, a high reflectivity thin film called layer "one" of aluminum based alloy approximately 60 nanometers in thickness was deposited using a suitable aluminum alloy sputtering target in another sputtering machine. These two half discs were then spin-coated with suitable liquid organic resins separately, bonded together with layer "zero" and layer "one" facing each other and cured with ultraviolet light. The distance between the layer "zero" and layer "one" was kept at approximately 55+/−5 microns within the disc. The reflectivity of the two information layers was measured from the same side of the disc and found to be about the same at 19 percent for the 650 nanometers wavelength laser light. Electronic signals such as jitter and PI error were measured and found also to be within the published DVD specification. Subsequently, an accelerated aging test at 80 degrees C. and 85 percent relative humidity for 10 days was conducted on these discs.

Afterwards, the reflectivity and the electronic signals were measured again and no significant changes were observed as compared to the same measurements before the aging test.

Example 6

A silver based alloy sputtering target with the composition in a/o of approximately 2.4 percent gold, 1.3 percent palladium, 0.2 percent platinum, 0.7 percent copper and the balance silver was employed to produce the semi-reflective layer of the DVD-9 dual layer disc. The procedure used to make the discs is the same as in Example 5 above, except the thickness of the semi-reflective layer was approximately 10 nm. The reflectivity of the two information layers in the finished disc was measured from the same side of the disc and found to be about the same at 25.5 percent for the 650 nanometers wavelength laser light. Electronic signals such as jitter and PI error were also measured and found to be within the published DVD specification. Subsequently an accelerated aging test at 80 degrees C. and 85 percent relative humidity for 96 hours was conducted on these discs. Afterwards, the reflectivity and the electronic signals were measured again and no significant changes were observed as compared to the same measurements before aging test.

Example 7

A silver based alloy sputtering target with the composition in a/o of approximately 2.0 percent copper and the balance silver was employed to produce the semi-reflective layer of the DVD-9 dual layer disc. The procedure used to make the discs is the same as in Example 5 above, except the thickness of the semi-reflective layer was approximately 9–11 nm. The reflectivity of the two information layers in the finished disc was measured from the same side of the disc and found to be about the same at 23.5 percent for the 650 nanometers wavelength laser light. Electronic signals such as jitter and PI error were also measured and found to be within the published DVD specification. Subsequently an accelerated aging test at 70 degrees C. and 50 percent relative humidity for 96 hours was conducted on these discs. Afterwards, the reflectivity and the electronic signals were measured again and no significant changes were observed as compared to the same measurements before aging test.

Example 8

A copper based alloy sputtering target with the composition in a/o of approximately 0.8 percent beryllium, 0.1 percent silver, 0.6 percent magnesium, 1.4 percent zinc and the balance copper was used to produce the high reflectivity layer of the Super Audio Compact Disc (SACD), another type of prerecorded dual layer optical disc with the following procedure: On top of a transparent polycarbonate half disc of about 0.6 mm thickness and 12 cm in diameter with CD type of information pits injection molded from a suitable stamper, a high reflectivity layer of copper based alloy thin film approximately 85 nm thick was deposited using the sputtering target of the above mentioned composition in a magnetron sputtering machine. On top of another transparent polycarbonate half disc of about 0.6 mm in thickness and 12 cm in diameter with Super Audio type of information pits injection molded from another suitable stamper, a semi-transparent and semi-reflective thin film was deposited by reactive magnetron sputtering. The two halves discs were then bonded together by UV curable resin so that the distance of the conventional CD layer and the high density SACD layer is approximately 0.6 mm. Afterwards, another suitable organic resin was spin-coated on top of the copper alloy thin film and cured with ultraviolet light. In the finished disc, a 650 nm laser beam will playback the high density SACD layer through about 0.6 mm thickness of clear substrate and a 780 nm laser beam will playback the conventional CD layer through about 1.2 mm thickness of clear substrate. The reflectivity of the CD layer with the copper alloy thin film was measured to be approximately 79 percent. Other electronic signals such as jitter and C1 error were also measured and found to be acceptable. Subsequently, an accelerated aging test at 80 degrees C. and 85% RH for 7 days was conducted on these discs. Afterwards, the reflectivity and the electronic signals were measured again and no significant changes were observed as compared to the same measurements before the aging test.

Example 9

A silver based alloy sputtering target with the composition in a/o % of approximately 1.5% beryllium, 0.3% platinum, 0.8% copper and the balance silver was used to produce the reflective layer of a DVD-R disc, another type of recordable disc according to FIG. 2 with the following procedure: On top of a transparent polycarbonate half disc of about 0.6 mm thickness and 12 cm in diameter with pregrooves suitable for DVD-R injection molded from a suitable stamper, a cyanine based recording dye was spin-coated on the substrate, dried, and subsequently a reflective layer of silver based alloy approximately 60 nm in thickness was deposited on the recording dye using the sputtering target of the above mentioned composition in a magnetron sputtering machine. Afterwards, this half disc was bonded to another 0.6 mm thickness half disc by a UV cured resin. Information was recorded onto the disc in a DVD-R recorder and quality of the electronic signal measured. Then the disc was subjected to an accelerated aging test at 80 degrees C. and 85% RH for 96 hours. Afterwards, the electronic signals were measured again and no significant changes were observed as compared to the same measurements before aging test.

Example 10

A silver alloy sputtering target having the composition in a/o %: Pd, 1.2%; Pt, 0.5%, Cu, 0.3%; Au, 1.0% and balance silver was used to produce a dual layer optical information storage medium as depicted in FIG. 3. Thin film about 10 nanometers thickness of this silver alloy was deposited by a magnetron sputtering machine on a suitable polycarbonate substrate. Its optical constants measured and presented in FIG. 5, its calculated reflectivity and transmission presented in FIG. 6 for wavelength from 400 to 800 nanometers. The feasibility of using the same silver alloy thin film for both the reflective layer and the semi-reflective layer of a dual layer ultra high density read-only optical disc with a playback laser wavelength at 400 nanometers is investigated. As indicated in FIG. 3, the indices of refraction n of the transparent substrate 214, the semi-reflective layer 216, the spacer layer 218 and the high reflectivity layer 220, are 1.605, 0.034, 1.52 and 0.034 respectively. The extinction coefficient k for the semi-reflective layer and the high reflectivity layer is 2.0. Calculation shows that with a thickness of 22 nm, the semi-reflective layer will have a reflectivity $R_0$ of 0.363 and a transmission $T_0$ of 0.615 in the disc at 400 nm wavelength. With a thickness of 55 nm, the high reflectivity layer will have a reflectivity $R_1$ of 0.95. The reflectivity of the high reflectivity layer measured from outside the disc through the semi-reflective layer will be $R_0=R_1T_0^2$ or 0.36. In other words, to the detector outside the disc, the reflectivity from both the semi-reflective layer and the high reflectivity layer will be approximately the same at 0.36. This fulfills one of the important requirements of a dual layered optical information storage medium that the reflectivity from these 2 layers of information should be approximately equal and the relationship between the optical properties of these two layers is $R_0=R_1T_0^2$.

Example 11

The same silver alloy in example 9 can also be used as the high reflectivity layer and the two semi-reflective layers in a tri-layer optical information storage medium as depicted in FIG. 4. at 400 nm playback laser wavelength. Calculations show that for a thickness of 16 nm for the first semi-reflective layer 316, a thickness of 22 nm for the second semi-reflective layer 320 and a thickness of 50 nm for the high reflectivity layer 324 in FIG. 4, the reflectivity measured at the detector 332 will be 0.214, 0.214, 0.212 respectively from the three layers. And approximately the same reflectivity from all three layers can be achieved. The reflectivity $R_0$ and the transmission To of the first semi-reflective layer are 0.214 and 0.769 respectively. The reflectivity $R_1$ and the transmission $T_1$ of the second semi-reflective layer in the medium are 0.362 and 0.615 respectively. The reflectivity of the third layer $R_2$ or the high reflectivity layer is 0.95. To the external detector 332, the reflectivity from the second semi-reflective layer equals $R_1T_0^2$ or 0.214 and the reflectivity of the third layer equals $R_2T_0^2T_1^2$ or 0.212. Thus balance of reflectivity from three information layers using the same silver alloy can be achieved and one sputtering machine and one silver alloy sputtering target can be used to manufacture all three layers of an ultra high density tri-layer optical information storage medium with playback laser wavelength at 400 nm in a production environment. It will be obvious that the aluminum alloys or the copper alloys described in this invention can also be used for the high reflectivity layer of this tri-layer medium.

Example 12

A process to make the sputtering target with the composition as indicated in example 9 will be described hereafter. Initially a master alloy of silver, palladium and platinum is made with suitable initial charge in a vacuum arc melting furnace with tungsten electrode and water cooled copper hearth. Later this master alloy is placed in the crucible of a vacuum induction furnace with suitable charges of silver, copper and gold. The vacuum furnace is pumped down to vacuum pressure of approximately 1 millitorr and then induction heating current turn on to heat the charge. While the charge is heating up and the out gassing is finished, the furnace can be back filled with argon gas to a pressure of about 0.2 to 0.4 atmosphere. Casting of the liquid melt can be accomplished at a temperature approximately 10% above the melting point of the charge. The graphite crucible holding the melt can be equipped with a graphite stopper at the bottom of the crucible. Pouring of the molten metal into individual molds of each sputtering target can be accomplished by opening and closing of the graphite stopper and synchronizing this action with mechanically bringing each mold into position just underneath the melting crucible so that the proper amount of melt can be poured and cast into each target mold by gravity. Afterwards, additional argon flow into the vacuum furnace can be introduced to cool and quench the casting to lower temperature. Subsequently, a cold or warm multi-directional rolling process with more than 50% thickness reduction can be used to break up any nonuniform casting microstructure. Then final anneal is done at 550 to 600 degrees C. in a protective atmosphere for 15 to 30 minutes. After machining the target piece into the right shape and size, cleaning in detergent and properly dried, the finished sputtering target is ready to be put into a magnetron sputtering apparatus to coat optical discs. The approximate sputtering parameters to make the semi-reflective layer of an ultra high density optical disc with playback laser wavelength at 400 nanometers as mentioned in example 9 are about 1 kilowatt of sputtering power, about 1 second of sputtering time at an argon partial pressure of 1 to 3 millitorr for a deposition rate of about 10 nanometers per second with the target to disc distance of approximately 4 to 6 centimeters. The high reflectivity layer can be made with about the same sputtering parameters as the semi-reflective layer except the sputtering power needs to be increased to 4 to 5 kilowatts to deposit the high reflectivity layer using the same sputtering target and sputtering apparatus. Thus a 5 inch diameter ultra high density read-only optical disc can be made in this manner with user storage capacity of about 12 to 15 giga bytes per side. A dual layer disc with the construction as shown in FIG. 3. can store approximately 24 to 30 giga bytes of information, enough for a full length motion picture in the high-definition digital television format.

Example 13

A silver based alloy sputtering target with the composition in a/o % of approximately 2.0% copper and the balance silver was used to produce the reflective layer of a DVD-R disc, another type of recordable disc according to FIG. 2 with the following procedure: On top of a transparent polycarbonate half disc of about 0.6 mm thickness and 12 cm in diameter with pregrooves suitable for DVD-R injection molded from a suitable stamper, an azo based recording dye was spin-coated on the substrate, dried, and subsequently a reflective layer of silver based alloy approximately 100 nm in thickness was deposited on the recording dye using the sputtering target of the above mentioned composition in a magnetron sputtering machine. Afterwards, this half disc was bonded to another 0.6 mm thickness half disc by an UV cured resin. Information was recorded onto the disc in a DVD-R recorder and quality of the electronic signal measured. Then the disc was subjected to an accelerated aging test at 70 degrees C. and 50% RH for 96 hours. Afterwards, the electronic signals were measured again and no significant changes were observed in the signal as compared to the same measurements before the aging test.

IN THE CLAIMS

While the invention has been illustrated and described in detail, this is to be considered as illustrative and not restrictive of the patent rights. The reader should understand that only the preferred embodiments have been presented and all changes and modifications that come within the spirit of the invention are included if the following claims or the legal equivalent of these claims describes them.

I claim:

1. An optical storage medium, comprising:
   a first layer having a first pattern of features in at least one major surface;

a semi-reflective layer, said semi-reflective layer including a metal alloy, said metal alloy including silver and palladium, wherein the relationship between the amounts of silver and palladium in the metal alloy is defined by $Ag_xPd_w$ where $0.90<x<0.999$ and $0.001<w<0.10$;

a second layer having a second pattern of features in at least one major surface; and a high reflective layer.

2. The optical storage medium of claim 1, further comprising an optically recordable dye layer adjacent to said semi-reflective layer.

3. The optical storage medium of claim 2, wherein the first pattern of features includes a spiral groove.

4. The optical storage medium of claim 1, wherein $0.001<w<0.05$.

5. The optical storage medium of claim 1, further comprising:

a third layer adjacent to said semi-reflective layer, said third layer including a dielectric material;

a fourth layer, said fourth layer including an optically re-recordable material; and a fifth layer, said fifth layer including a dielectric material.

6. The optical storage medium of claim 5, wherein the first pattern of features includes a spiral groove.

7. The optical storage medium of claim 5, wherein said optically re-recordable material is a phase-changeable material.

8. The optical storage medium of claim 7, wherein said optically re-recordable material further comprises a phase changeable material selected from the group consisting of Ge—Sb—Te, As—In—Sb—Te, Cr—Ge—Sb—Te, As—Te—Ge, Te—Ge—Sn, Te—Ge—Sn—O, Te—Se, Sn—Te—Se, Te—Ge—Sn—Au, Ge—Sb—Te, Sb—Te—Se, In—Se—Tl, In—Sb, In—Sb—Se, In—Se—Tl—Co, Bi—Ge, Bi—Ge—Sb, Bi—Ge—Te, and Si—Te—Sn.

9. The optical storage medium of claim 5, wherein said optically re-recordable material is a magneto-optic material.

10. The optical storage medium of claim 9, wherein said optically re-recordable material further comprises a magneto-optic material selected from the group consisting of Tb—Fe—Co and Gd—Tb—Fe.

11. An optical storage medium, comprising:

a first layer having a first pattern of features in at least one major surface;

a semi-reflective layer, said semi-reflective layer including a metal alloy, said metal alloy including silver, and platinum, wherein the relationship between the amounts of silver and platinum in the metal alloy is defined by $Ag_xPt_z$ where $0.95<x<0.999$ and $0.001<z<0.05$;

a second layer having a second pattern of features in at least one major surface; and a high reflective layer.

12. The optical storage medium of claim 11, further comprising an optically recordable dye layer adjacent to said semi-reflective layer.

13. The optical storage medium of claim 12, wherein the first pattern of features includes a spiral groove.

14. The optical storage medium of claim 11, wherein $0.001<z<0.025$.

15. The optical storage medium of claim 11, further comprising:

a third layer adjacent to said semi-reflective layer, said third layer including a dielectric material;

a fourth layer, said fourth layer including an optically re-recordable material; and a fifth layer, said fifth layer including a dielectric material.

16. The optical storage medium of claim 15, wherein the first pattern of features includes a spiral groove.

17. The optical storage medium of claim 15, wherein said optically re-recordable material is a phase-changeable material.

18. The optical storage medium of claim 17, wherein said optically re-recordable material further comprises a phase changeable material selected from the group consisting of Ge—Sb—Te, As—In—Sb—Te, Cr—Ge—Sb—Te, As—Te—Ge, Te—Ge—Sn, Te—Ge—Sn—O, Te—Se, Sn—Te—Se, Te—Ge—Sn—Au, Ge—Sb—Te, Sb—Te—Se, In—Se—Tl, In—Sb, In—Sb—Se, In—Se—Tl—Co, Bi—Ge, Bi—Ge—Sb, Bi—Ge—Te, and Si—Te—Sn.

19. The optical storage medium of claim 15, wherein said optically re-recordable material is a magneto-optic material.

20. The optical storage medium of claim 19, wherein said optically re-recordable material further comprises a magneto-optic material selected from the group consisting of Tb—Fe—Co and Gd—Tb—Fe.

21. An optical storage medium, comprising:

a first layer having a first pattern of features in at least one major surface;

a semi-reflective layer, said semi-reflective layer including a metal alloy, said metal alloy including silver, copper, and platinum, wherein the relationship between the amounts of silver, copper and platinum in the metal alloy is defined by $Ag_xCu_yPt_z$ where $0.85<x<0.9989$; $0.0001<y<0.10$; and $0.001<z<0.05$.

a second layer having a second pattern of features in at least one major surface; and a high reflective layer.

22. The optical storage medium of claim 21, further comprising an optically recordable dye layer adjacent to said semi-reflective layer.

23. The optical storage medium of claim 22, wherein the first pattern of features includes a spiral groove.

24. The optical storage medium of claim 21, wherein $0.0001<y<0.05$.

25. The optical storage medium of claim 21, further comprising:

a third layer adjacent to said semi-reflective layer, said third layer including a dielectric material;

a fourth layer, said fourth layer including an optically re-recordable material; and a fifth layer, said fifth layer including a dielectric material.

26. The optical storage medium of claim 25, wherein the first pattern of features includes a spiral groove.

27. The optical storage medium of claim 25, wherein said optically re-recordable material is a phase-changeable material.

28. The optical storage medium of claim 27, wherein said optically re-recordable material further comprises a phase changeable material selected from the group consisting of Ge—Sb—Te, As—In—Sb—Te, Cr—Ge—Sb—Te, As—Te—Ge, Te—Ge—Sn, Te—Ge—Sn—O, Te—Se, Sn—Te—Se, Te—Ge—Sn—Au, Ge—Sb—Te, Sb—Te—Se, In—Se—Tl, In—Sb, In—Sb—Se, In—Se—Tl—Co, Bi—Ge, Bi—Ge—Sb, Bi—Ge—Te, and Si—Te—Sn.

29. The optical storage medium of claim 25, wherein said optically re-recordable material is a magneto-optic material.

30. The optical storage medium of claim 29, wherein said optically re-recordable material further comprises a magneto-optic material selected from the group consisting of Tb—Fe—Co and Gd—Tb—Fe.

31. An optical storage medium, comprising:
a first layer having a first pattern of features in at least one major surface;
a semi-reflective layer, said semi-reflective layer including a metal alloy, said metal alloy including silver, copper, and palladium, wherein the relationship between the amounts of silver, copper and palladium in the metal alloy is defined by $Ag_xCu_yPd_w$ where $0.80<x<0.9989$; $0.0001<y<0.10$; and $0.001<w<0.10$.
a second layer having a second pattern of features in at least one major surface; and
a high reflective layer.

32. The optical storage medium of claim 31, further comprising an optically recordable dye layer adjacent to said semi-reflective layer.

33. The optical storage medium of claim 32, wherein the first pattern of features includes a spiral groove.

34. The optical storage medium of claim 31, wherein $0.0001<y<0.05$.

35. The optical storage medium of claim 31, further comprising:
a third layer adjacent to said semi-reflective layer, said third layer including a dielectric material;
a fourth layer, said fourth layer including an optically re-recordable material; and
a fifth layer, said fifth layer including a dielectric material.

36. The optical storage medium of claim 35, wherein the first pattern of features includes a spiral groove.

37. The optical storage medium of claim 35, wherein said optically re-recordable material is a phase-changeable material.

38. The optical storage medium of claim 37, wherein said optically re-recordable material further comprises a phase changeable material selected from the group consisting of Ge—Sb—Te, As—In—Sb—Te, Cr—Ge—Sb—Te, As—Te—Ge, Te—Ge—Sn, Te—Ge—Sn—O, Te—Se, Sn—Te—Se, Te—Ge—Sn—Au, Ge—Sb—Te, Sb—Te—Se, In—Se—Tl, In—Sb, In—Sb—Se, In—Se—Tl—Co, Bi—Ge, Bi—Ge—Sb, Bi—Ge—Te, and Si—Te—Sn.

39. The optical storage medium of claim 35, wherein said optically re-recordable material is a magneto-optic material.

40. The optical storage medium of claim 39, wherein said optically re-recordable material further comprises a magneto-optic material selected from the group consisting of Tb—Fe—Co and Gd—Tb—Fe.

41. An optical storage medium, comprising:
a first layer having a first pattern of features in at least one major surface;
a semi-reflective layer, said semi-reflective layer including a metal alloy, said metal alloy including silver, copper and gold, wherein the relationship between the amounts of silver, copper and gold in the metal alloy is defined by $Ag_xCu_yAu_v$ where $0.80<x<0.9989$; $0.0001<y<0.10$ and $0.001<v<0.10$.
a second layer having a second pattern of features in at least one major surface; and
a high reflective layer.

42. The optical storage medium of claim 41, further comprising an optically recordable dye layer adjacent to said semi-reflective layer.

43. The optical storage medium of claim 42, wherein the first pattern of features includes a spiral groove.

44. The optical storage medium of claim 41, wherein $0.0001<y<0.05$ and $0.001<v<0.05$.

45. The optical storage medium of claim 41, further comprising:
a third layer adjacent to said semi-reflective layer, said third layer including a dielectric material;
a fourth layer, said fourth layer including an optically re-recordable material; and
a fifth layer, said fifth layer including a dielectric material.

46. The optical storage medium of claim 45, wherein the first pattern of features includes a spiral groove.

47. The optical storage medium of claim 45, wherein said optically re-recordable material is a phase-changeable material.

48. The optical storage medium of claim 47, wherein said optically re-recordable material further comprises a phase changeable material selected from the group consisting of Ge—Sb—Te, As—In—Sb—Te, Cr—Ge—Sb—Te, As—Te—Ge, Te—Ge—Sn, Te—Ge—Sn—O, Te—Se, Sn—Te—Se, Te—Ge—Sn—Au, Ge—Sb—Te, Sb—Te—Se, In—Se—Tl, In—Sb, In—Sb—Se, In—Se—Tl—Co, Bi—Ge, Bi—Ge—Sb, Bi—Ge—Te, and Si—Te—Sn.

49. The optical storage medium of claim 45, wherein said optically re-recordable material is a magneto-optic material.

50. The optical storage medium of claim 49, wherein said optically re-recordable material further comprises a magneto-optic material selected from the group consisting of Tb—Fe—Co and Gd—Tb—Fe.

51. An optical storage medium, comprising:
a first layer having a first pattern of features in at least one major surface;
a semi-reflective layer, said semi-reflective layer including a metal alloy, said metal alloy including silver, copper, palladium and platinum, wherein the relationship between the amounts of silver, copper, palladium and platinum in the metal alloy is defined by $Ag_xCu_yPt_zPd_w$ where $0.75<x<0.9979$, $0.0001<y<0.10$, $0.001<z<0.05$, and $0.001<w<0.10$.
a second layer having a second pattern of features in at least one major surface; and
a high reflective layer.

52. The optical storage medium of claim 51, further comprising an optically recordable dye layer adjacent to said semi-reflective layer.

53. The optical storage medium of claim 52, wherein the first pattern of features includes a spiral groove.

54. The optical storage medium of claim 51, wherein $0.0001<y<0.05$, $0.001<z<0.03$, $0.001<w<0.03$.

55. The optical storage medium of claim 51, further comprising:
a third layer adjacent to said semi-reflective layer, said third layer including a dielectric material;
a fourth layer, said fourth layer including an optically re-recordable material; and
a fifth layer, said fifth layer including a dielectric material.

56. The optical storage medium of claim 55, wherein the first pattern of features includes a spiral groove.

57. The optical storage medium of claim 55, wherein said optically re-recordable material is a phase-changeable material.

58. The optical storage medium of claim 57, wherein said optically re-recordable material further comprises a phase changeable material selected from the group consisting of Ge—Sb—Te, As—In—Sb—Te, Cr—Ge—Sb—Te, As—Te—Ge, Te—Ge—Sn, Te—Ge—Sn—O, Te—Se, Sn—Te—Se, Te—Ge—Sn—Au, Ge—Sb—Te, Sb—Te—Se, In—Se—Tl, In—Sb, In—Sb—Se, In—Se—Tl—Co, Bi—Ge, Bi—Ge—Sb, Bi—Ge—Te, and Si—Te—Sn.

59. The optical storage medium of claim 55, wherein said optically re-recordable material is a magneto-optic material.

60. The optical storage medium of claim 59, wherein said optically re-recordable material further comprises a magneto-optic material selected from the group consisting of Tb—Fe—Co and Gd—Tb—Fe.

61. An optical storage medium, comprising:
a first layer having a first pattern of features in at least one major surface;
a semi-reflective layer, said semi-reflective layer including a metal alloy, said metal alloy including copper and silver, wherein the relationship between the amounts of copper and silver in the metal alloy is defined by $Cu_y Ag_x$ where $0.95<y<0.9999$, $0.0001<x<0.05$.
a second layer having a second pattern of features in at least one major surface; and
a high reflective layer.

62. The optical storage medium of claim 61, further comprising an optically recordable dye layer adjacent to said semi-reflective layer.

63. The optical storage medium of claim 62, wherein the first pattern of features includes a spiral groove.

64. The optical storage medium of claim 61, wherein $0.001<x<0.05$.

65. The optical storage medium of claim 61, further comprising:
a third layer adjacent to said semi-reflective layer, said third layer including a dielectric material;
a fourth layer, said fourth layer including an optically re-recordable material; and
a fifth layer, said fifth layer including a dielectric material.

66. The optical storage medium of claim 65, wherein the first pattern of features includes a spiral groove.

67. The optical storage medium of claim 65, wherein said optically re-recordable material is a phase-changeable material.

68. The optical storage medium of claim 67, wherein said optically re-recordable material further comprises a phase changeable material selected from the group consisting of Ge—Sb—Te, As—In—Sb—Te, Cr—Ge—Sb—Te, As—Te—Ge, Te—Ge—Sn, Te—Ge—Sn—O, Te—Se, Sn—Te—Se, Te—Ge—Sn—Au, Ge—Sb—Te, Sb—Te—Se, In—Se—Tl, In—Sb, In—Sb—Se, In—Se—Tl—Co, Bi—Ge, Bi—Ge—Sb, Bi—Ge—Te, and Si—Te—Sn.

69. The optical storage medium of claim 65, wherein said optically re-recordable material is a magneto-optic material.

70. The optical storage medium of claim 69, wherein said optically re-recordable material further comprises a magneto-optic material selected from the group consisting of Tb—Fe—Co and Gd—Tb—Fe.

71. An optical storage medium, comprising:
a first layer having a first pattern of features in at least one major surface;
a semi-reflective layer, said semi-reflective layer including a metal alloy, said metal alloy including copper and magnesium, wherein the relationship between the amounts of copper and magnesium in the metal alloy is defined by $Cu_y Mg_q$ where $0.90<y<0.999$, $0.001<q<0.10$.
a second layer having a second pattern of features in at least one major surface; and
a high reflective layer.

72. The optical storage medium of claim 71, further comprising an optically recordable dye layer adjacent to said semi-reflective layer.

73. The optical storage medium of claim 72, wherein the first pattern of features includes a spiral groove.

74. The optical storage medium of claim 71, wherein $0.001<q<0.05$.

75. The optical storage medium of claim 71, further comprising:
a third layer adjacent to said semi-reflective layer, said third layer including a dielectric material;
a fourth layer, said fourth layer including an optically re-recordable material; and
a fifth layer, said fifth layer including a dielectric material.

76. The optical storage medium of claim 75, wherein the first pattern of features includes a spiral groove.

77. The optical storage medium of claim 75, wherein said optically re-recordable material is a phase-changeable material.

78. The optical storage medium of claim 77, wherein said optically re-recordable material further comprises a phase changeable material selected from the group consisting of Ge—Sb—Te, As—In—Sb—Te, Cr—Ge—Sb—Te, As—Te—Ge, Te—Ge—Sn, Te—Ge—Sn—O, Te—Se, Sn—Te—Se, Te—Ge—Sn—Au, Ge—Sb—Te, Sb—Te—Se, In—Se—Tl, In—Sb, In—Sb—Se, In—Se—Tl—Co, Bi—Ge, Bi—Ge—Sb, Bi—Ge—Te, and Si—Te—Sn.

79. The optical storage medium of claim 75, wherein said optically re-recordable material is a magneto-optic material.

80. The optical storage medium of claim 79, wherein said optically re-recordable material further comprises a magneto-optic material selected from the group consisting of Tb—Fe—Co and Gd—Tb—Fe.

81. An optical storage medium, comprising:
a first layer having a first pattern of features in at least one major surface;
a semi-reflective layer, said semi-reflective layer including a metal alloy, said metal alloy including copper and zinc wherein the relationship between the amounts of copper and zinc in the metal alloy is defined by $Cu_y Zn_m$ where $0.90<y<0.999$, $0.001<m<0.10$.
a second layer having a second pattern of features in at least one major surface; and
a high reflective layer.

82. The optical storage medium of claim 81, further comprising an optically recordable dye layer adjacent to said semi-reflective layer.

83. The optical storage medium of claim 81, wherein the first pattern of features includes a spiral groove.

84. The optical storage medium of claim 81, wherein $0.001<m<0.05$.

85. The optical storage medium of claim 81, further comprising:
a third layer adjacent to said semi-reflective layer, said third layer including a dielectric material;
a fourth layer, said fourth layer including an optically re-recordable material; and
a fifth layer, said fifth layer including a dielectric material.

86. The optical storage medium of claim 85, wherein the first pattern of features includes a spiral groove.

87. The optical storage medium of claim 85, wherein said optically re-recordable material is a phase-changeable material.

88. The optical storage medium of claim 87, wherein said optically re-recordable material further comprises a phase changeable material selected from the group consisting of Ge—Sb—Te, As—In—Sb—Te, Cr—Ge—Sb—Te, As—Te—Ge, Te—Ge—Sn, Te—Ge—Sn—O, Te—Se, Sn—Te—Se, Te—Ge—Sn—Au, Ge—Sb—Te, Sb—Te—Se, In—Se—Tl, In—Sb, In—Sb—Se, In—Se—Tl—Co, Bi—Ge, Bi—Ge—Sb, Bi—Ge—Te, and Si—Te—Sn.

89. The optical storage medium of claim 85, wherein said optically re-recordable material is a magneto-optic material.

90. The optical storage medium of claim 89, wherein said optically re-recordable material further comprises a magneto-optic material selected from the group consisting of Tb—Fe—Co and Gd—Tb—Fe.

91. An optical storage medium, comprising:
   a first layer having a first pattern of features in at least one major surface;
   a semi-reflective layer, said semi-reflective layer including a metal alloy, said metal alloy including copper and zinc wherein the relationship between the amounts of copper and zinc in the metal alloy is defined by $Cu_y Al_n$ where $0.80<y<0.999$, $0.001<n<0.20$.
   a second layer having a second pattern of features in at least one major surface; and
   a high reflective layer.

92. The optical storage medium of claim 91, further comprising an optically recordable dye layer adjacent to said semi-reflective layer.

93. The optical storage medium of claim 92, wherein the first pattern of features includes a spiral groove.

94. The optical storage medium of claim 91, wherein $0.001<n<0.10$.

95. The optical storage medium of claim 91, further comprising:
   a third layer adjacent to said semi-reflective layer, said third layer including a dielectric material;
   a fourth layer, said fourth layer including an optically re-recordable material; and
   a fifth layer, said fifth layer including a dielectric material.

96. The optical storage medium of claim 95, wherein the first pattern of features includes a spiral groove.

97. The optical storage medium of claim 95, wherein said optically re-recordable material is a phase-changeable material.

98. The optical storage medium of claim 97, wherein said optically re-recordable material further comprises a phase changeable material selected from the group consisting of Ge—Sb—Te, As—In—Sb—Te, Cr—Ge—Sb—Te, As—Te—Ge, Te—Ge—Sn, Te—Ge—Sn—O, Te—Se, Sn—Te—Se, Te—Ge—Sn—Au, Ge—Sb—Te, Sb—Te—Se, In—Se—Tl, In—Sb, In—Sb—Se, In—Se—Tl—Co, Bi—Ge, Bi—Ge—Sb, Bi—Ge—Te, and Si—Te—Sn.

99. The optical storage medium of claim 95, wherein said optically re-recordable material is a magneto-optic material.

100. The optical storage medium of claim 99, wherein said optically re-recordable material further comprises a magneto-optic material selected from the group consisting of Tb—Fe—Co and Gd—Tb—Fe.

* * * * *